United States Patent
Aviv

(10) Patent No.: US 9,208,403 B1
(45) Date of Patent: Dec. 8, 2015

(54) SYSTEMS AND METHODS FOR PROCESSING IMAGE DATA ASSOCIATED WITH LINE DETECTION

(71) Applicant: QUALCOMM Incorporated, San Diego, CA (US)

(72) Inventor: Rotem Aviv, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/306,039

(22) Filed: Jun. 16, 2014

(51) Int. Cl.
G06K 9/48 (2006.01)
G06K 9/62 (2006.01)
G06T 1/20 (2006.01)
G06T 7/00 (2006.01)

(52) U.S. Cl.
CPC ............... *G06K 9/6212* (2013.01); *G06T 1/20* (2013.01); *G06T 7/0085* (2013.01); *G06T 7/0095* (2013.01); *G06T 2200/28* (2013.01); *G06T 2207/20061* (2013.01)

(58) Field of Classification Search
CPC ............. G06K 9/4633; G06K 9/52; G06T 2207/20048; G06T 2207/20061; G06T 7/004
USPC ........................................................ 382/199
See application file for complete search history.

(56) References Cited

U.S. PATENT DOCUMENTS

| | | | |
|---|---|---|---|
| 3,069,654 A | 12/1962 | Hough | |
| 7,016,552 B2 * | 3/2006 | Koyama | G06K 9/3283 382/281 |
| 7,672,507 B2 | 3/2010 | Fan | |
| 8,040,351 B1 | 10/2011 | Diard | |
| 8,131,098 B2 | 3/2012 | Watanabe et al. | |
| 9,064,177 B1 * | 6/2015 | Maurer | G06T 7/001 |
| 2005/0180636 A1 * | 8/2005 | Iizuka | G06K 9/6857 382/217 |

OTHER PUBLICATIONS

Antolovic, Danko, "Review of the Hough Transform Method, With an Implementation of the Fast Hough Variant for Line Detection," Technical Report TR663, 2008, Indiana University and IBM Corporation, 11 pages.
Duda, Richard O. et al., "Use of the Hough Transformation to Detect Lines and Curves in Pictures," Graphics and Image Processing, Association for Computing Machinery, Inc., Jan. 1972, vol. 15, No. 1, 5 pages.
Hamarneh, G., et al., "Automatic Line Detection," Project Report for the Computer Vision Course, Sep. 1999, Chalmers University of Technology, Gothenburg, Sweden, pp. 1-29.
Yang, GZ et al., "Hough Transform," Computer Vision, Department of Computing, Imperial College, <http://wwwu.uni-klu.ac.at/alfasih/File/hough%20transform.pdf> retrieved Jun. 13, 2014.

* cited by examiner

*Primary Examiner* — Manuchehr Rahmjoo
(74) *Attorney, Agent, or Firm* — Toler Law Group, PC

(57) ABSTRACT

In a particular embodiment, a method includes receiving line segment data at a processing core. The line segment data is associated with multiple candidate line segments associated with a first group of pixels of an image. The line segment data includes an angle value and/or a distance value for each of the multiple candidate line segments. The method further includes identifying, at the processing core, a set of line segments of the multiple candidate line segments by comparing angle values and/or distance values associated with the multiple candidate line segments. The method also includes determining, at the processing core, a representative line segment based on the set of line segments of the multiple candidate line segments. The method further includes storing, by the processing core, line segment information based on the representative line segment.

20 Claims, 8 Drawing Sheets

SYSTEMS AND METHODS FOR PROCESSING IMAGE DATA ASSOCIATED WITH LINE DETECTION

I. FIELD

The present disclosure is generally related to processing image data to detect a line included in an image.

II. DESCRIPTION OF RELATED ART

Advances in technology have resulted in smaller apparatuses and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless devices, such as wireless telephones, may be configured to detect and/or track a line in a series of images. To perform line detection and/or line tracking, a wireless device may implement a Hough Transform to detect straight lines (e.g., line segments) in an image. To detect one or more lines in the image, the Hough Transform may generate two-dimensional (2D) histogram data associated with potential lines. The 2D histogram is related to a size of the image and may also be related to a maximum length of a detected line and, for large images, the 2D histogram may consume a large amount of memory space. Additionally, a processor of the wireless device may have to perform an exhaustive and time consuming search of data within the memory space to detect one or more lines based on the 2D histogram. Because of the large amount of memory space and the processing power needed to detect the one or more lines, implementing the Hough Transform is problematic when performed by a mobile device (e.g., the wireless device) which has limited memory space and limited processing power.

III. SUMMARY

A device, such as a mobile device, may be configured to detect and/or track one or more line segments in one or more images. The device may include one or more processors, such as a graphical processing unit (GPU) and a central processing unit (CPU), that are configured to implement a Hough Transform to detect the one or more line segments. For example, the GPU (or a DSP) may perform the Hough transform on image data to generate histogram data, such as two dimensional (2D) angle-distance histogram data associated with a group of pixels of an image. Based on the histogram data, the GPU may identify candidate line segments (each having a corresponding angle value, a distance value, coordinate (e.g., pixel) location, and/or a length value) associated with the group of pixels. The identified candidate line segments may be provided to the CPU and the CPU may process the candidate line segments to identify one or more detected line segments associated with the group of pixels. For example, the CPU may merge candidate line segments that have similar angle values and/or distance values and identify a merged line segment (e.g., a representative line segment) as a detected line segment.

The GPU is configured to process image data such that an amount of histogram data (e.g., a size of a histogram) generated by the GPU fits within a cache memory, such as a level 2 cache memory or a level 2 and a level 3 cache memory, associated with the GPU. For example, an image may be divided into a plurality of tiles (e.g., multiple groups of pixels) and the GPU may generate histogram data for each tile. The GPU may further use one or more reference points to determine distance values when generating one or more angle and distance pairs to be included in histogram data for a particular tile. By dividing an image into multiple tiles and using one or more reference points to process each tile, the histogram data may be stored in the cache memory as opposed to a main memory, which enables faster access of the histogram data to process the histogram data to identify one or more candidate line segments.

When tiling is used to process the image, detected line segments within each tile may be consolidated prior to merging detected line segments across multiple tiles. Consolidating detected line segments within a tile may lead to improved accuracy of a resultant line segment detected within the tile. Additionally, by consolidating the detected line segments, a number of detected line segments to be processed by an inter tile merger may be reduced; thus, a speed of identifying one or more global lines associated with an image may be increased.

In a particular embodiment, a method includes receiving line segment data generated at a processing core. The line segment data is associated with multiple candidate line segments associated with a first group of pixels of an image. The line segment data includes an angle value for each of the multiple candidate line segments, a distance value for each of the multiple candidate line segments, or a combination thereof. The method also includes identifying, at the processing core, a set of line segments of the multiple candidate line segments by comparing angle values associated with the multiple line segments, by comparing distance values associated with the multiple candidate line segments, or a combination thereof. The method further includes determining, at the processing core, a representative line segment (e.g., a "candidate" representative line segment) based on the set of line segments of the multiple candidate line segments. The method includes storing, by the processing core, line segment information based on the representative line segment.

In another particular embodiment, a device includes one or more processing core configured to determine line segment data associated with multiple candidate line segments associated with a first group of pixels of an image. The line segment data includes an angle value for each of the multiple candidate line segments, a distance value for each of the multiple candidate line segments, or a combination thereof. The one or more processing cores is further configured to identify a set of line segments of the multiple candidate line segments and to determine a representative line segment based on the set of line segments. The device also includes a memory configured to store line segment information based on the representative line segment.

In another particular embodiment, a computer-readable medium storing instructions that are executable by a processor to cause the processor to perform operations including receiving line segment data associated with multiple candidate line segments associated with a first group of pixels of an image. The line segment data includes an angle value for each of the multiple candidate line segments, a distance value for each of the multiple candidate line segments, or a combination thereof. The instructions further cause the processor to perform operations including identifying a set of line segments of the multiple candidate line segments by comparing angle values associated with the multiple candidate line segments, distance values associated with the multiple candidate line segments, or a combination thereof. The instructions further cause the processor to perform operations including determining a representative line segment based on the set of line segments of the multiple candidate line segments and determining line segment information based on the representative line segment. The line segment information includes at least one end point coordinate associated with the representative line segment.

One particular advantage provided by at least one of the disclosed embodiments is that by performing the candidate line segment detection at a first processor (e.g., the GPU or the DSP) and by performing the line merging to merge multiple candidate line segments at a second processor (e.g., the CPU), different processors may be selected that are best suited for a particular task. By dividing the processing tasks between multiple processors that are each suited for their respective tasks, power consumption may be reduced in a system or device that uses multiple processors as compared to a system that uses a single processor for candidate line segment detection and for line merging. Another particular advantage provided by at least one of the disclosed embodiments is that by being able to save the histogram data into a cache memory, an amount of processing time and an amount of power consumed may be reduced as compared to a system that saves the histogram data to a main memory. Reducing the amount of processing time and the amount of power may enable implementation of the Hough transform (to detect one or more lines in an image) by a mobile device. Additionally, by dividing the processing tasks between the multiple processors, different stages (e.g., processing tasks) may be pipelined and a processing throughput of the multiple processors may be increased.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular embodiments of the present disclosure are described below with reference to the drawings. In the description, common features are designated by common reference numbers throughout the drawings.

Figure 1:
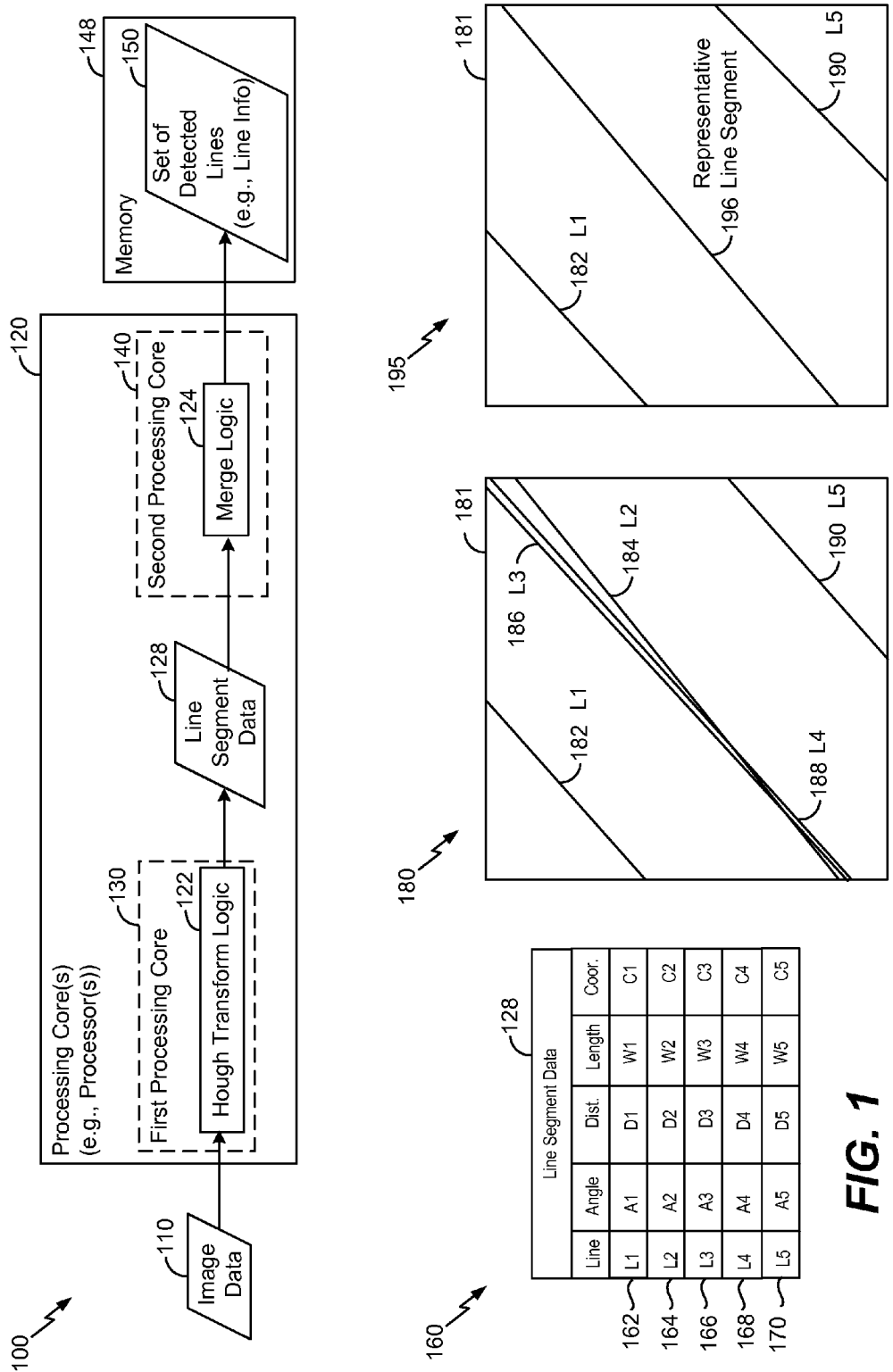
FIG. 1 is a block diagram of a first illustrative system for processing image data to detect a line segment associated with an image.

Referring to FIG. 1, an illustrative embodiment of a system 100 operable to process image data to detect a line associated with an image is shown. The system 100 includes one or more processing cores 120 (e.g., one or more processors) and a memory 148. The system 100 may be included and/or embedded in a device, such as an electronic device. In a particular embodiment, the electronic device may be a mobile device that includes an image sensor, such as a camera, configured to capture images. For example, the electronic device may capture an image and may generate corresponding image data 110.

Figure 2:
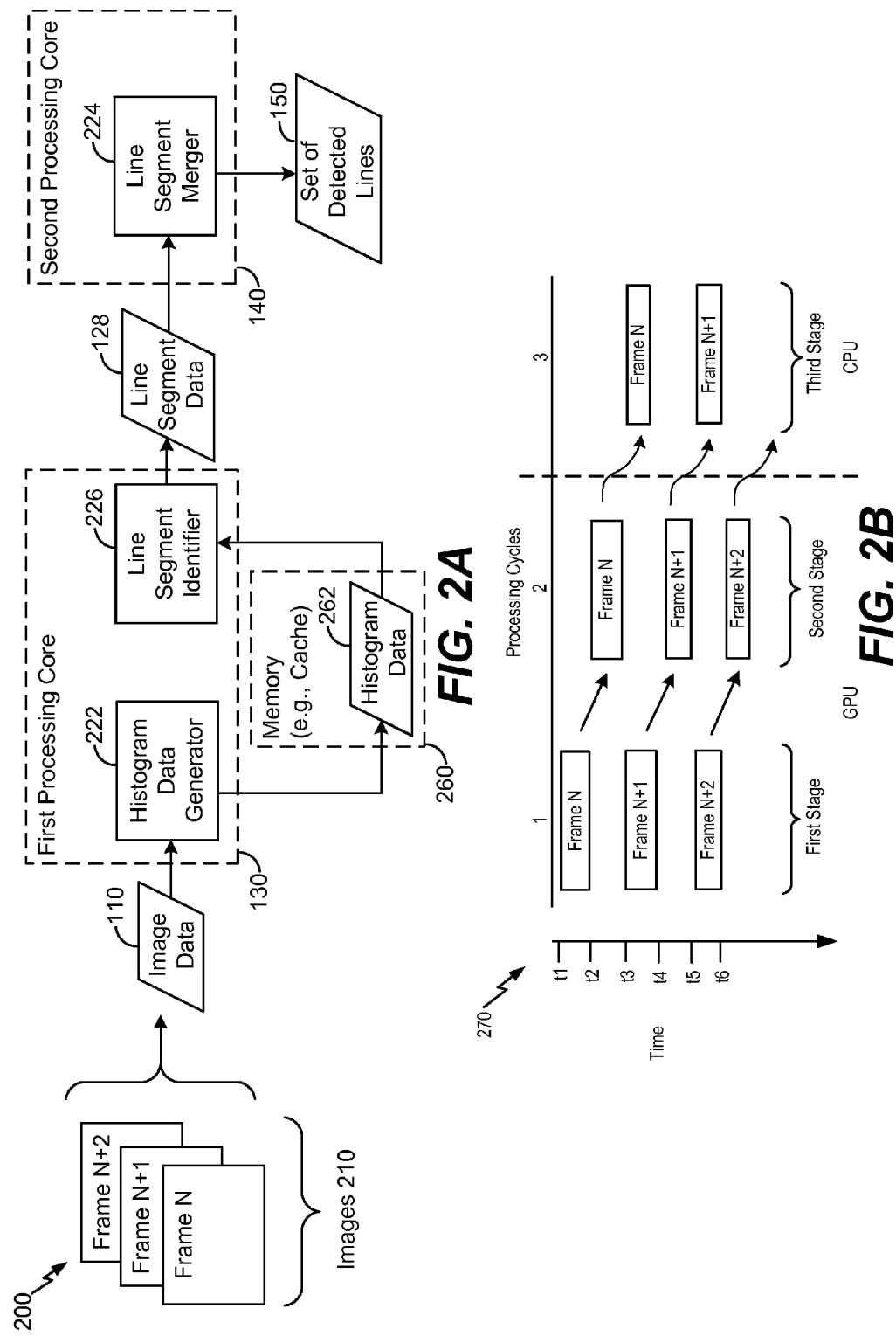
FIG. 2A is a block diagram of a second illustrative system for processing image data to detect a line included in an image.
FIG. 2B is a diagram illustrating pipelined processing of images to detect and/or track a line.

The processing core(s) 120 may include one or more processing cores, such as a first processing core 130 and a second processing core 140. Each processing core may include or may be coupled to a hierarchy of one or more memories, such as one or more cache memories (e.g., a level 1 (L1) cache memory, a level 2 (L2) cache memory, and/or a level 3 (L3) cache memory) and a main memory. Each processing core may correspond to (e.g., may be included in) a different processor. Alternatively, multiple processing cores may be included in a single processor. The first processing core 130 may be included in or correspond to a graphical processing unit (GPU) or a digital signal processor (DSP). The second processing core 140 may be included in or correspond to a central processing unit (CPU) or the DSP. The first processing core 130 and the second processing core 140 may be pipelined to process the image data 110, as described herein with reference to FIG. 2B.

The image data 110 may be associated with (e.g., based on) the image. For example, the image data 110 may correspond to a group of pixels of the image. The group of pixels may include a subset of or all of the pixels of the image. In a particular embodiment, the image data 110 may correspond to one or more groups of pixels (e.g., one or more tiles of the image), as described further herein with reference to FIGS. 3A-3C. For example, the image data 110 may include or correspond to pixel values, such as pixel intensity values, gradient values, and/or luminescence values. Each pixel value may include a coordinate, such as a Cartesian coordinate (e.g., an x-y coordinate), associated with a location of a corresponding pixel within the image (e.g., within the group of pixels).

The first processing core 130 may be configured to receive the image data 110. Prior to being received at the first processing core 130 (e.g., a first processing unit), the image data 110 may be subject to preprocessing, such as filtering, edge detection, or a combination thereof, as illustrative, non-limiting examples. Based on the image data 110, the first processing core 130 may determine line segment data 128 associated with the group of pixels of the image. For example, the line segment data 128 may be associated with one or more candidate line segments corresponding to the group of pixels of the image. The line segment data 128 may include one or more entries that each correspond to a different candidate line segment. Each entry included in the line segment data 128 may include an angle value, a distance value, one or more coordinate values, or a combination thereof, as described further herein.

The first processing core 130 may include Hough transform logic 122 to generate the line segment data 128. The Hough transform logic 122 may process the image data 110 to generate one or more candidate lines that correspond to the group of pixels. For example, the Hough transform logic 122 may perform a Hough transform to transform the image data 110 from a Cartesian space (e.g., an x-y coordinate space) to a parameter space (e.g., a distance-angle space) in which a candidate line segment may be defined. When mapped to the parameter space, multiple points associated with a candidate line segment may cluster around parameter values that correspond to the candidate line segment. Accordingly, the candidate line segment may be detected by evaluating an accumulation of points in the parameter space. For example, the multiple points may be mapped to the parameter space by generating two-dimensional (2D) histogram data (e.g., angle-distance 2D histogram data) that corresponds to a 2D histogram. The accumulation of points corresponding to a candidate line segment may be identified based on one or more local maximums of the 2D histogram data.

To perform the Hough transform to map the image data 110 to the parameter space, the Hough transform logic 122 may identify data values (e.g., pixels) of the image data 110 that satisfy (e.g., are greater than or equal to) a threshold value. For example, when the image data 110 includes pixel intensity values, the Hough transform logic 122 may compare each pixel intensity value to a pixel intensity threshold. For each data value that satisfies the threshold value, the Hough transform logic 122 may map a corresponding pixel of the image from the Cartesian space (e.g., an x-y coordinate space) to the parameter space (e.g., a distance-angle space).

Figure 4:
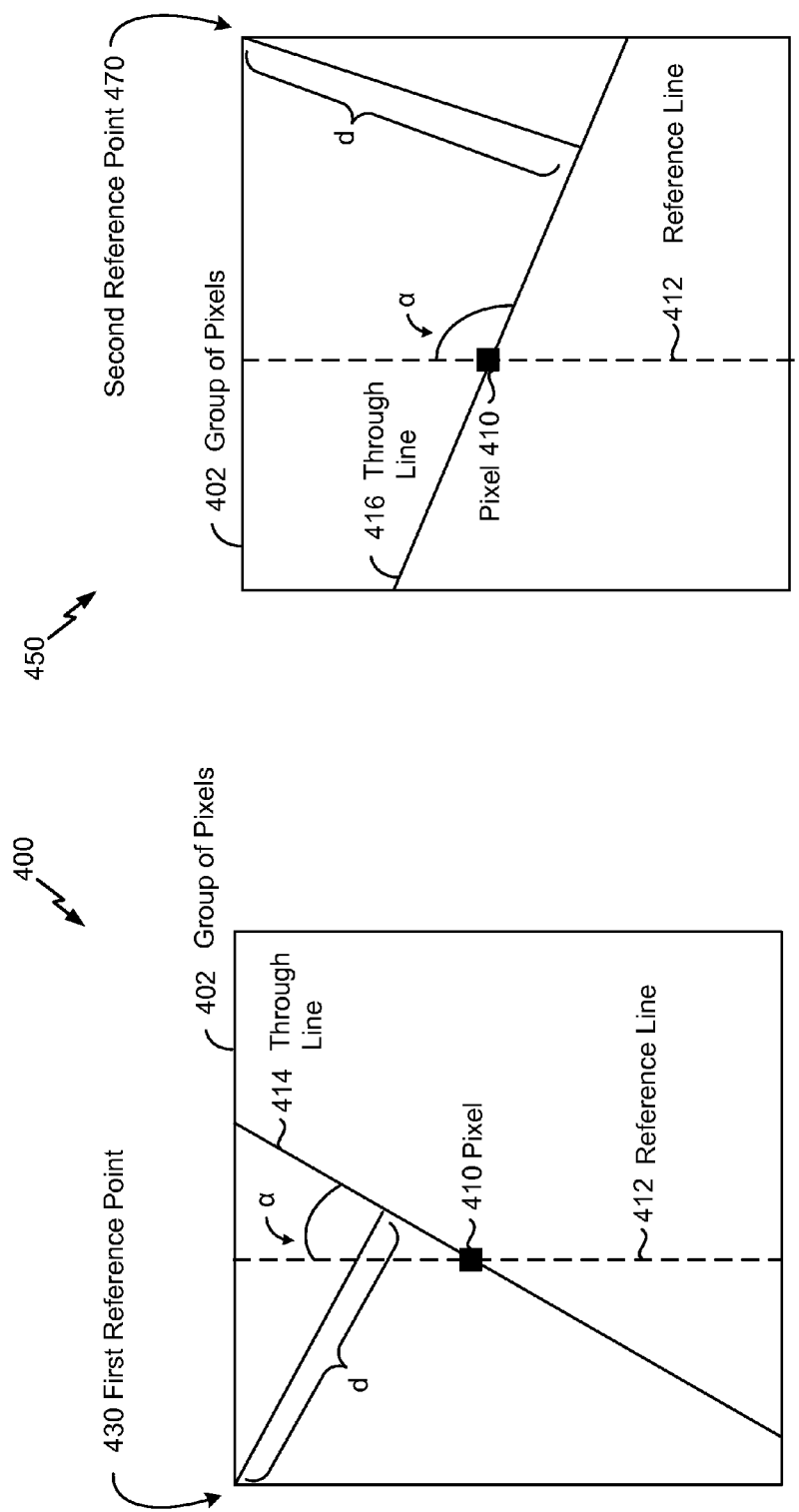
FIG. 4A is a diagram of a first reference point used to determine a distance value of a pixel included in a group of pixels.
FIG. 4B is a diagram of a second reference point used to determine a distance value of a pixel included in a group of pixels.

To map a particular pixel to the parameter space, the Hough transform logic 122 may determine multiple angle-distance pairs for the particular pixel. For example, the Hough transform logic 122 may determine an angle ($\alpha$) (e.g., an angle value) and a distance (d) (e.g., a distance value) associated with each of multiple through lines that pass through the particular pixel, such as multiple through lines generated by the Hough transform logic 122 as part of the Hough transform. As an illustrative, non-limiting example, for a particular through line of the multiple through lines, the angle ($\alpha$) may be an angle between a reference line (a vertical line) and the particular through line and the distance (d) may represent an algebraic distance between a reference point and the particular through line. The reference point may be associated with an origin of the Cartesian space, a corner of the group of pixels, or a corner of the image. Accordingly, for each line of the one or more through lines, the Hough transform logic 122 may generate an angle ($\alpha$)-distance (d) pair. Each angle ($\alpha$)-distance (d) pair may be included in the 2D histogram data generated by the Hough transform logic 122. In a particular embodiment, the Hough transform logic 122 may determine the distance (d) using one of multiple reference points, as described with reference to FIGS. 4A-4B.

After the 2D histogram data is generated, the Hough transform logic 122 may search the 2D histogram data to identify angle ($\alpha$)-distance (d) pairs that may be associated with candidate line segments of the image. For example, the 2D histogram data may be searched for local maximum points associated with a 2D histogram (e.g., a 2D histogram populated using the angle ($\alpha$)-distance (d) pairs) that corresponds to the group of pixels. Each local maximum point may be associated with a candidate line segment. For example, a particular maximum point may correspond to a particular angle ($\alpha$)-distance (d) pair. In some embodiments, the 2D histogram data may be filtered (e.g., using a Gaussian kernel) prior to performing a local maximum search. The filtering may reduce a detection error per line segment and contribute to improved accuracy in detecting one or more line segments included in the image. Based on the particular identified angle ($\alpha$)-distance (d) pair associated with a candidate line segment, the Hough transform logic 122 may generate candidate data associated with the candidate line segment, such as candidate data included in the line segment data 128. The candidate data may include an angle value of the angle ($\alpha$) based on the angle ($\alpha$)-distance (d) pair, a distance value of the distance (d) based on the angle ($\alpha$)-distance (d) pair, a slope of the candidate line segment, a pixel location (included in the group of pixels) used to generate the angle ($\alpha$)-distance (d) pair, a point (e.g., a Cartesian coordinate) that the candidate line segment passes through, such as a pixel location, or a combination thereof, as illustrative, non-limiting examples.

An illustrative example of the line segment data 128 is depicted in a table that is generally designated 160. The table 160 may include one or more entries 162-170. Each entry of the one or more entries 162-170 may identify a candidate line segment that includes a corresponding angle value and a corresponding distance value. Alternatively or additionally, the line segment data 128 may include length data and/or coordinate data (e.g., a pixel location) for each of the multiple candidate line segments included in the line segment data 128. For example, the line segment data 128 may include a first entry 162 that identifies a first line (L1), a first angle (A1), a first distance (D1), a first length (W1), and a first coordinate (C1), a second entry 164 that identifies a second line (L2), a second angle (A2), a second distance (D2), and a second length (W2), and a second coordinate (C2), a third entry 166 that identifies a third line (L3), a third angle (A3), a third distance (D3), a third length (W3), and a third coordinate (C3), a fourth entry 168 that identifies a fourth line (L4), a fourth angle (A4), a fourth distance (D4), a fourth length (W4), and a fourth coordinate (C4), and a fifth entry 170 that identifies a fifth line (L5), a fifth angle (A5), a fifth distance (D5), a fifth length (W5), and a fifth coordinate (C5). Although five entries are illustrated as being included in the line segment data 128, the line segment data 128 may include less than five entries or more than five entries.

The table 160 of the line segment data 128 may correspond to multiple candidate line segments included in a group of pixels 181 of the image, as illustrated at 180. For example, the line segment data 128 may include the first entry 162 that corresponds to a first line 182 (L1), the second entry 164 that corresponds to a second line 184 (L2), the third entry 166 that corresponds to a third line 186 (L3), the fourth entry 168 that corresponds to a fourth line 188 (L4), and the fifth entry 170 that corresponds to a fifth line 190 (L5). The group of pixels 181 may be associated with a rectangular area (e.g., a square area) of an image. For example, the group of pixels 181 may be associated with or correspond to a horizontal dimension that is the same as a vertical dimension associated with or corresponding to the group of pixels 181. As another example, the group of pixels 181 may be associated with or correspond to a horizontal dimension that is different than a vertical dimension associated with or corresponding to the group of pixels 181. As depicted at 180, each candidate line segment is represented as traversing (e.g., spanning) the group of pixels 181 from a first corresponding side of the rectangular area to a second corresponding side of the rectangular area.

Referring to the system 100, the second processing core 140 may be configured to receive the line segment data 128 associated with the one or more candidate lines segments detected based on the image data 110. The second processing core 140 may process the line segment data 128 to generate a set of detected lines 150 (e.g., line segment information) that identifies one or more detected lines corresponding to the group of pixels of the image.

The second processing core 140 may include merge logic 124. The merge logic 124 may be configured to process the line segment data 128 to generate and/or identify one or more detected line segments associated with the group of pixels. To process the line segment data 128, the merge logic 124 may identify one or more sets of candidate lines based on the line segment data 128. Each candidate line segment included in a particular set of candidate lines may have a similar angle value and/or a similar distance value. Alternatively, or in addition, each candidate line segment included in the particular set of candidate lines may have a similar length value. For example, a first set of candidate line segments may include multiple candidate line segments of the line segment data 128 that each has a similar angle value and/or a similar distance value. As another example, a second set of candidate lines may include a single candidate line segment of the line segment data 128 (e.g., the single candidate line segment having an angle value and/or a distance value that is not similar to other candidate line segments included in the line segment data 128).

To illustrate, the merge logic 124 may select a particular candidate line segment from the line segment data 128 that has a particular angle value and/or a particular distance value. The merge logic 124 may compare the particular angle value and/or a particular distance value to angle values and/or distance values of other candidate line segments included in the line segment data 128. For example, the merge logic 124 may determine that another angle value is similar to the particular angle value if the other angle value is within a range of the particular angle value, such as a predetermined range based on the particular angle value (e.g., ±5 degrees) or a range based on a percentage (e.g., ±5%) of the particular angle value.

As another example, the merge logic 124 may determine that another distance value is similar to the particular distance value if the other distance value is within a range of the particular distance value, such as a predetermined range based on the particular distance value or a range based on a percentage (e.g., ±5%) of a maximum distance value that may be determined based on a reference point and the group of pixels 181. When the merge logic 124 uses two reference points to determine distance values for candidate line segments, as described further with reference to FIG. 3 and FIGS. 4A-4B, the merge logic 124 may convert one or more distance values. For example, as described further herein with reference to FIG. 3 and FIGS. 4A-4B, distance values corresponding to angles that are between 0-90 degrees $$(e.g., 0 - \frac{\pi}{2} \text{radians})$$

may be determined from a first reference point (e.g., an upper left hand corner of the group of pixels 181) and distance values corresponding to angles between 90-180 degrees $$(e.g., \frac{\pi}{2} - \pi \text{ radians})$$

may be determined from a second reference point (e.g., an upper right hand corner of the group of pixels). When two reference points are available to calculate distance values, the merge logic 124 may convert one or more distance values for angle-distance pairs that have angle values around 90 degrees $$(e.g., \frac{\pi}{2} \text{radians}),$$

such as angle values within a range of 85-95 degrees or 80-90 degrees, as illustrative, non-limiting examples. The merge logic 124 may convert the one or more distance values so that each of the distance values, for each of the angle-distance pairs having angle values around 90 degrees, corresponds to the same reference point. To illustrate, if a line segment E1 has an angle value F1 and a distance value G1, where G1 is relative to the upper left hand corner of the group of pixels 181, and a line segment E2 has an angle value F2 and a distance value G2, where G2 is relative to the upper right hand corner of the group of pixels 181, the merge logic 124 may convert the distance G1 to be relative to the upper right hand corner if the angle F1 and the angle F2 are similar. In this way, the converted distance G1 may be compared to the distance G2. Alternatively, the distance G2 may be converted to be relative to the upper left hand corner and a comparison may be made between the distance G1 and the converted distance G2.

Alternatively, or in addition, the merge logic 124 may compare a particular length value to length values of other candidate lines segments included in the line segment data 128. For example, the merge logic 124 may determine that another length value is similar to the particular length value if the other length value is within a range associated with the particular length value, such as a predetermined range based on the particular length value (±0.5 mm) or a range based on a percentage (±5%) of a maximum length value that may be determined based on the group of pixels 181. The merge logic 124 may perform a length comparison prior to performing an angle comparison and/or a distance comparison.

The merge logic 124 may filter the line segment data 128 prior to comparing angle values, distance values, and/or length values. For example, the merge logic 124 may compare each length value to a threshold value and discard candidate line segments (e.g., entries) that do not satisfy the threshold value. For example, the merge logic 124 may discard candidate line segments that are not greater than or equal to the threshold value.

For each set of candidate line segments, the merge logic 124 may identify a corresponding detected line segment. For example, when the merge logic 124 processes a set of candidate line segments that includes a single candidate line segment, the merge logic 124 may be configured to identify the single candidate line segment as a detected line segment. As another example, when the merge logic 124 processes a set of candidate line segments that includes multiple candidate line segments, the merge logic 124 may be configured to merge the multiple candidate line segments into a representative line segment and to identify the representative line segment as a detected line segment. The merge logic 124 may generate the representative line segment by performing a linear regression to combine the multiple candidate line segments. To illustrate, the merge logic 124 may use the line segment data 128 to identify coordinate information (e.g., one or more coordinate pair values) for each line segment included in the first set of line segments and may perform a linear regression using the coordinate information to generate the representative line segment. If the line segment data 128 includes angle and distance information but does not include coordinate information for each line segment, the merge logic 124 may be configured to determine coordinate information for each line segment based on the angle and distance information and one or more boundaries (e.g., borders) of the group of pixels 181.

The merge logic 124 (e.g., the second processing core 140) may determine and output the set of detected lines 150 (e.g., detected line segment information) based on one or more detected line segments. For example, the set of detected lines 150 may include an entry for each detected line segment. Each entry of the set of detected lines 150 may include a line identifier, an angle ($\alpha$) associated with the detected line segment, a distance (d) associated with the detected line segment, a slope of the detected line segment, a point (e.g., a Cartesian coordinate) that the detected line segment passes through, an endpoint (based on a border of the group of pixels 181) of the detected line segment, or a combination thereof, as illustrative, non-limiting examples.

The merge logic 124 may track the one or more candidate line segments included in the line segment data 128 so that each candidate line segment is only used once to generate a detected line segment. For each detected line segment generated, the merge logic 124 may mark (e.g., flag) the one or more candidate line segments (or one or more corresponding entries of the line segment data 128) used to identify the generated detected line segment.

To illustrate operation of the merge logic 124, reference is made to the table illustrated at 160 and to the group of pixels 181 illustrated at 180. The merge logic 124 (e.g., the second processing core 140) may process the entries 162-170 of the table 160 and may identify one or more sets of candidate line segments. For example, the merge logic 124 may select the first entry 162 and may determine whether one or more of the other entries 164-170 have angle values, distance values, and/or length values, that are similar to the angle and distance value and/or the length value of the first entry 162. When the merge logic 124 determines that the first entry 162 is not similar to the other entries 164-170, the merge logic 124 may identify the first line 182 (L1) as a first detected line segment and may generate first detected line data, based on the first entry 162, to be included in the set of detected lines 150. The first line 182 (L1) is depicted as a detected line associated with the group of pixels 181 of the image, as illustrated at 195.

After processing the first entry 162, the merge logic 124 may mark the first entry 162 as processed and may select the second entry 164. The merge logic 124 may determine whether one or more of the unmarked entries 166-170 have angle values, distance values, and/or length values that are similar to the angle and distance value and/or the length value of the second entry 164. The merge logic 124 may determine that the third entry 166 and the fourth entry 168 are similar to the second entry 164. Accordingly, the second entry 164, the third entry 166, and the fourth entry 168 may be associated with a set of candidate line segments to be merged, such as a set of candidate line segments that include the second line 184 (L2), the third line 186 (L3), and the fourth line 188 (L4), as illustrated at 180.

The second processing core 140 may generate (e.g., determine) a representative line segment based on the set of candidate line segments (e.g., the second line 184 (L2), the third line 186 (L3), and the fourth line 188 (L4)). To generate (e.g., determine) the representative line segment, the second processing core 140 may determine coordinate information for each candidate line segment included in the set of candidate line segments. The second processing core 140 (e.g., a second processing unit) may perform a linear regression using the coordinate information to generate the representative line segment. The linear regression may generate the representative line segment in a point-slope format. The merge logic 124 may generate an angle value, a distance value, a length value, or coordinate data of the representative line segment based on the point-slope format description of the representative line segment. The merge logic 124 may identify the representative line as a second detected line and may generate second detected line data, based on the representative line segment, to be included in the set of detected lines 150. The representative line (i.e., a representative line segment 196) is depicted as a detected line that is associated with the group of pixels 181 of the image, as illustrated at 195.

After processing the second entry 164, the merge logic 124 may mark the second entry 164, the third entry 166, and the fourth entry 168 as processed. The merge logic 124 may select the fifth entry 170 and determine whether there are unmarked entries to compare to the fifth entry 170. Based on a determination that there are no unmarked entries, the merge logic 124 may identify the fifth line 190 (L5) as a third detected line and may generate third detected line data, based on the fifth entry 170, to be included in the set of detected lines 150. The fifth line 190 (L5) is depicted as a detected line included in the group of pixels 181 of the image, as illustrated at 195.

In some embodiments, the merge logic 124 (e.g., the second processing core 140) may use weights (e.g., weighted averaging) for different candidate line segments when merging the set of line segments, such as when the linear regression is performed. For example, weights (e.g., multipliers) may be applied based on a length of each candidate line segment to be merged, such that long candidate line segments are more dominant than short line segments. The weighted averaging may contribute to better accuracy of a generated representative line segment.

The set of detected lines 150 (e.g., one or more detected line segments) may be provided to the memory 148, such as a cache memory corresponding to the second processing core 140 or a main memory of a device that includes the system 100. The memory 148 may be configured to receive and to store the set of detected lines 150. The memory 148 may include a volatile memory and/or a non-volatile memory. Although the memory 148 is illustrated as being separate from the one or more processing cores 120, the memory 148 may be coupled to and/or included in the one or more processing cores 120, such as included in the second processing core 140.

The set of detected lines 150 may be used to detect a line segment included in the image that corresponds to the image data 110, to detect one or more shapes included in the image, to track a line segment (or a shape) in multiple images, or a combination thereof, as illustrative, non-limiting examples. For example, the set of detected lines 150 may be accessible to an application associated with a device that includes the one or more processing cores 120.

During operation of the system 100, the first processing core 130 may receive the image data 110. The image data 110 may be associated with a group of pixels of an image. The first processing core 130 may identify one or more pixels of the first group of pixels and may perform a Hough transform on the one or more pixels to generate 2D histogram data (e.g., angle-distance 2D histogram data). For example, for each pixel of the one or more pixels, the first processing core 130 may generate a number of angle ($\alpha$)-distance (d) pairs and populate the 2D histogram data based on the angle ($\alpha$)-distance (d) pairs. In some embodiments, each angle (α)-distance (d) pair may include or may be associated with a corresponding length value.

The first processing core 130 may use the 2D histogram data to determine line segment data 128 corresponding to one or more candidate line segments associated with the image and corresponding to the group of pixels. The first processing core 130 may provide the line segment data 128 to the second processing core 140.

The second processing core 140 may identify one or more sets of candidate line segments associated with the group of pixels based on the line segment data 128. The second processing core 140 may identify the one or more sets of candidate line segments by comparing angle values associated with the one or more candidate line segments, by comparing distance values associated with the one or more candidate line segments, by comparing length values associated with the one or more candidate line segments, or a combination thereof. For example, each candidate line segment included in a particular set of line segments may have a similar angle value, a similar distance value, a similar length value, or a combination thereof. For each set of candidate line segments, the second processing core 140 may determine a corresponding detected line segment associated with the group of pixels. When the particular set of candidate line segments includes multiple candidate line segments, the second processing core 140 may generate a representative line segment to be used as a detected line segment. The second processing core 140 may determine and output the set of detected lines 150 that identifies each detected line segment. The set of detected lines 150 may be stored in a memory (e.g., a cache memory or a main memory) or may be provided to an application associated with a device that includes the one or more processing cores 120.

In other embodiments, the first processing core 130 may implement a coarse-to-fine search associated with a Gaussian pyramid to detect one or more candidate line segments associated with the image. For example, the first processing core 130 may perform one or more iterations, where each iteration of processing an image is at a higher resolution than a prior iteration of processing the image, to detect candidate line segments associated with an image. With each successive iteration, less than an entirety of the image may be processed based on one or more detected line segments associated with a prior iteration. To illustrate, during a first iteration, a low resolution version of the image may be processed to detect one or more potential candidate line segments. During a second iteration, a higher resolution version of the image, as compared to the low resolution version, may be divided into multiple regions (e.g., multiple tiles) and the first processor may process the regions that correspond to locations of detected lines based on the first iteration. Accordingly, the first processing core 130 may reduce a portion of the image searched with each successive iteration and thus save time in processing an entirety of the image to detect one or more candidate lines associated with the image.

By merging multiple candidate line segments into a representative line segment, an angle detection error and/or a distance detection error resulting from the performance of the Hough transform may be reduced. Additionally, by performing the candidate line segment detection at the first processing core 130 and performing the line merging at the second processing core 140, different processing cores may be selected that are best suited for a particular task. For example, a GPU or a DSP may be selected to perform the candidate line segment detection and a CPU or a DSP may be selected to perform line merging. By dividing the processing tasks between multiple processors that are each suited for their respective tasks, power consumption may be reduced in a system or device that uses multiple processors as compared to a system that uses a single processor for candidate line segment detection and for line merging.

Referring to FIG. 2A, an illustrative embodiment of a system 200 operable to process image data to detect a line segment associated with an image is shown. The system 200 may include or correspond to the system 100 of FIG. 1. The system 200 may be configured to process multiple image frames 210 (e.g., sequential image frames) in a pipelined manner, as described further with reference to FIG. 2B.

The system 200 may include the first processing core 130, the second processing core 140, and a memory 260 (e.g., a main memory and/or a cache memory, such as a level 1 (L1) cache, a level 2 (L2) cache, and/or a level 3 (L3) cache). Although the memory 260 is illustrated as being separate from the first processing core 130, in other embodiments the memory 260 may be included in the first processing core 130. The first processing core 130 may be configured to receive the image data 110. The image data 110 may include or correspond to one or more of the multiple images 210, such as a first image (Frame N), a second image (Frame N+1), and/or a third image (Frame N+2), as illustrative, non-limiting examples. Each image of the multiple images 210 may be associated with a plurality of pixels (e.g., the same number of pixels).

The first processing core 130 may include a histogram data generator 222 and a line segment identifier 226. Although the histogram data generator 222 and the line segment identifier 226 are illustrated as being included in a single processing core, in other embodiments the histogram data generator 22 and the line segment identifier 226 may be included in separate processing cores. The histogram data generator 222 and/or the line segment identifier 226 may be included in or correspond to the Hough transform logic 122 of FIG. 1. The histogram data generator 222 may be configured to identify at least a portion of the image data 110 that corresponds to a group of pixels of a particular image. Based on the portion of the image data 110, the histogram data generator 222 may generate histogram data 262 associated with the group of pixels. For example, the histogram data 262 may be associated with a 2D histogram, such as an angle-distance 2D histogram. The histogram data 262 may be stored in the memory 260.

The histogram data 262 stored in the memory 260 may be accessible to the line segment identifier 226. The line segment identifier 226 may be configured to identify one or more candidate line segments associated with the group of pixels based on the histogram data 262. For example, the line segment identifier 226 may be configured to perform one or more local maximum operations on the histogram data 262 to identify one or more candidate line segments. The line segment identifier 226 may collect each candidate line segment and generate the line segment data 128 that identifies each of the one or more candidate line segments. In some embodiments, the line segment identifier 226 may be configured to consolidate (e.g., merge) multiple local maximums that are close together such that the line segment identifier 226 identifies a single candidate line segment instead of multiple candidate line segments based on the multiple local maximums that are close together. When the multiple local maximums are consolidated, a resulting candidate line segment may have a distance value that is an average of distance values associated with the multiple local maximums and/or may have an angle value that is an average of angle values associated with the multiple local maximums.

The second processing core 140 may include a line segment merger 224. The line segment merger 224 may include or correspond to the merge logic 124 of FIG. 1. The line segment merger 224 may be configured to receive the line segment data 128 and to generate the set of detected lines 150 based on the line segment data 128.

In some embodiments, processing associated with a particular image frame, such as the second image (Frame N+1) may be limited (e.g., restricted) based on a previously processed image frame, such as the first image frame (Frame N). For example, if the system 200 (or the system 100 of FIG. 1) is configured to detect and track one or more line segments associated with a series of images, a detected line segment associated with a particular portion of one image frame, such as the first image frame (Frame N), may be used to limit a portion of a next frame, such as the second image frame (Frame N+1), that is processed. By processing a portion (e.g., a particular area including less than an entirety of the pixels of the next frame) of the next image frame as opposed to the entirety of the next frame, an amount of search time to detect a particular line segment in the next frame may be reduce and an amount of memory resource used to process the next image frame may be reduced.

Referring to FIG. 2B, a diagram illustrating pipelined processing of images to detect and/or track a line is depicted and designated 270. For example, the pipelined processing may be performed by the system 200 of FIG. 2A to process the multiple images 210. The pipelined processing of images may include multiple stages, such as a first stage, a second stage, and a third stage, as an illustrative, non-limiting example. The first stage may include or correspond to operations performed by the Hough transform logic 122 of FIG. 1 or the histogram data generator 222 of FIG. 2A. The second stage may include or correspond to operations performed by the Hough transform logic 122 of FIG. 1 or the line segment identifier 226 of FIG. 2A.

For each image, each of the stages may be associated with a different processing cycle of the image. To illustrate, for a particular image the first stage may be associated with a first processing cycle (1), the second stage may be associated with a second processing cycle (2), and the third stage may be associated with a third processing cycle (3).

At a first time t1, the first image (Frame N), such as first image data associated with the first image (Frame N), may be received at the first stage. During the first processing cycle (1) of the first image (Frame N), the first stage may be configured to generate two-dimensional (2D) histogram data (e.g., angle-distance 2D histogram data) associated with the first image (Frame N).

At a second time t2, processing of the first image (Frame N) may advance to the second stage. During the second processing cycle (2) of the first image (Frame N), the second stage may be configured to search the 2D histogram data associated with the first image (Frame N) for local maximum points to identify one or more candidate line segments (e.g., line segment data) associated with the first image (Frame N).

At a third time t3, processing of the first image (Frame N) may advance to the third stage and the first stage may receive the second image (Frame N+1). During the first processing cycle (1) of the second image (Frame N+1), the first stage may be configured to generate two-dimensional (2D) histogram data associated with the second image (Frame N+1). During the third processing cycle (3) of the first image (Frame N), the third stage may be configured to merge candidate line segments associated with the first image (Frame N) to generate detected line data (e.g., the set of detected lines 150 associated with the first image (Frame N)), such as coordinate data corresponding to a merged line (e.g., a representative line).

At a fourth time t4, processing of the second image (Frame N+1) may advance to the second stage. During the second processing cycle (2) of the second image (Frame N+1), the second stage may be configured to search the 2D histogram data associated with the second image (Frame N+1) for local maximum points to identify one or more candidate line segments associated with the second image (Frame N+1).

At a fifth time t5, processing of the second image (Frame N+1) may advance to the third stage and the first stage may receive the third image (Frame N+2). During the first processing cycle (1) of the third image (Frame N+2), the first stage may generate two-dimensional (2D) histogram data associated with the third image (Frame N+2). During the third processing cycle (3) of the second image (Frame N+1), the third stage may be configured to merge candidate line segments associated with the second image (Frame N+1) to generate detected line data (e.g., the set of detected lines 150 associated with the second image (Frame N+1)), such as coordinate data corresponding to a merged line (e.g., a representative line).

At a sixth time t6, processing of the third image (Frame N+2) may advance to the second stage. During the second processing cycle (2) of the third image (Frame N+2), the second stage may be configured to search the 2D histogram data associated with the third image (Frame N+2) for local maximum points to identify one or more candidate line segments associated with the third image (Frame N+2). Accordingly, FIG. 2B illustrates one example of a pipelining scheme that may be used to process image data. It is noted that the timing of the pipelining scheme illustrated at FIG. 2B is merely an illustrative, non-limiting example of a pipelining scheme and that the timing of the pipelining scheme may be dependent on (e.g., vary based on) a particular implementation of the pipelining scheme.

By providing the histogram data 262 to the memory 260, such as a cache memory, that is accessible to the histogram data generator 222 and to the line segment identifier 226, the line segment identifier 226 may quickly access the histogram data 262 without having to access a main memory. Additionally, by pipelining the first processing core 130 and the second processing core 140, a first processor (e.g., a GPU or a DSP) including the first processing core 130 may process a particular image frame while a second processor (e.g., a CPU) including the second processing core 140 is processing a different image frame. Processing multiple images in this pipelined manner may be efficient and beneficial for image processing in devices, such as mobile device, which typically have limited power resource, limited processing resources, and limited memory resources.

Figure 3:
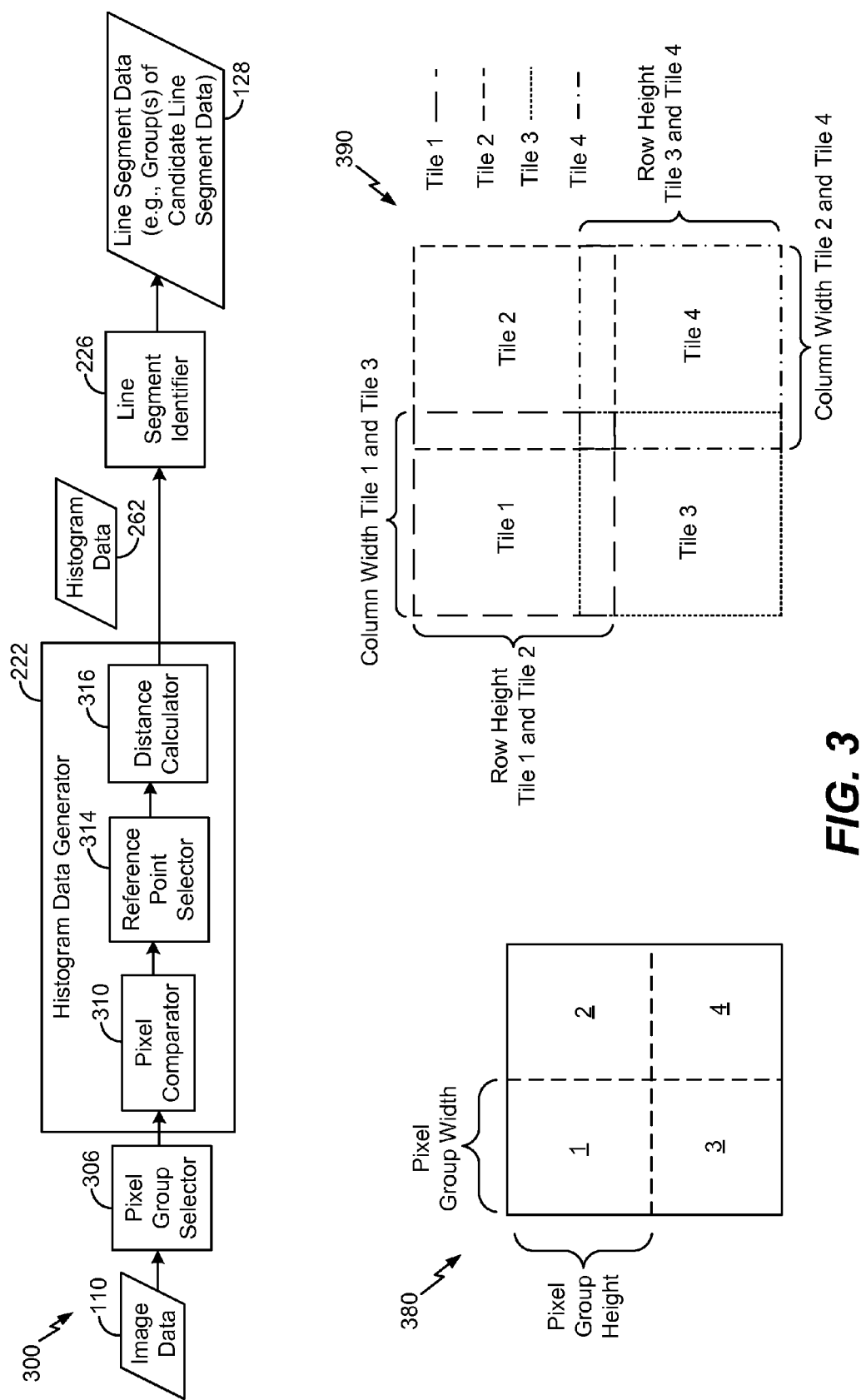
FIG. 3 is a block diagram of an illustrative system for processing image data to generate line segment data.

Referring to FIG. 3, a diagram of a system 300 for processing image data to generate line segment data is depicted. The system 300 may include a pixel group selector 306, the histogram data generator 222, and the line segment identifier 226. The system 300 may be included in or correspond to the system 100 of FIG. 1 or the system 200 of FIG. 2.

The pixel group selector 306 may be configured to receive the image data 110. For example, the image data 110 may be associated with an image, such as one of the images 210 of FIG. 2A, that includes a plurality of pixels. The pixel group selector 306 may divide the image data 110 into one or more data groups that each corresponds to a different area (e.g., a different group of pixels) of the image. For example, the pixel group selector 306 may divide the image into multiple tiles. In some embodiments, the pixel group selector 306 may be included in the first processing core 130 of FIG. 1, while in other embodiments the pixel group selector 306 is distinct from the first processing core 130.

A first illustrative example of an image divided into multiple tiles is depicted and designated 380. For example, the image at 380 may be divided into the multiple tiles by the pixel group selector 306. The multiple tiles may include four tiles, such as a first tile (1), a second tile (2), a third tile (3), and a fourth tile (4). Each of the multiple tiles may correspond to a different group of pixels. To illustrate, the first tile (1) may include a first group of pixels, the second tile (2) may include a second group of pixels, the third tile (3) may include a third group of pixels, and the fourth tile (4) may include a fourth group of pixels. The first group of pixels may be adjacent one or more other groups of pixels. For example, the first group of pixels may be neighboring the second group of pixels in a linear (e.g., horizontal or vertical) direction and may be neighboring the fourth group of pixels in a diagonal direction. The first tile (1) may have a pixel group width and a pixel group height that do not overlap other tiles.

A second illustrative example of an image divided into multiple tiles is depicted and designated 390. For example, the image 390 may be divided into the multiple tiles by the pixel group selector 306. The multiple tiles of the image 390 may include four tiles, such as a first tile (Tile 1), a second tile (Tile 2), a third tile (Tile 3), and a fourth tile (Tile 4). Each of the multiple tiles of the image 390 may overlap one or more other tiles. For example, a column width of the first tile (Tile 1) and the third tile (Tile 3) may overlap a column width of the second tile (Tile 2) and the fourth tile (Tile 4). As another example, a row height of the first tile (Tile 1) and the second tile (Tile 2) may overlap a row height of the third tile (Tile 3) and the fourth tile (Tile 4). Additionally, each tile of the image 390 may correspond to a different group of pixels. To illustrate, the first tile (Tile 1) may include a first group of pixels, the second tile (Tile 2) may include a second group of pixels, the third tile (Tile 3) may include a third group of pixels, and the fourth tile (Tile 4) include a fourth group of tiles. Because of the overlap between the multiple tiles of the image 390, the first group of pixels may include one or more pixels that are also included in another group of pixels.

Referring to the system 300, the histogram data generator 222 may receive the image data 110 after the pixel group selector 306 divides the image data into one or more data groups. In some embodiments, when the image data 110 is to be processed as a single group of pixels, the system 300 may not include the pixel group selector 306. The histogram data generator 222 may process each data group to generate corresponding histogram data. For example, the histogram data generator 222 may generate first histogram data corresponding to a first data group (e.g., a first group of pixels) and may generate second histogram data corresponding to a second data group (e.g., a second group of pixels).

The histogram data generator 222 may include a pixel comparator 310, a reference point selector 314, and a distance calculator 316. For a particular data group of the image data 110, the pixel comparator 310 may identify, based on the image data 110, pixels corresponding to the data group that have a corresponding data value (e.g., an intensity value, a gradient value, or a luminescence value) that satisfy a threshold value. For example, the threshold value may be a threshold pixel intensity value, a threshold gradient value, or a threshold luminescence value, as illustrative, non-limiting examples. Although the system 300 is depicted as including the pixel comparator 310, the pixel comparator 310 may be an optional component.

For each data value (e.g., pixel) that satisfies the threshold value, the reference point selector 314 may select a reference point to be used to generate one or more angle-distance pairs associated with the pixel. For example, the reference point selector 314 may select a reference point to use for each of a number of lines plotted through the pixel at different angles, such as angles ranging from 0-180 degrees (e.g., 0 to $\pi$ radians). To illustrate, the reference point may be associated with a corner of an area that defines a particular group of pixels, a corner of the image, or another location (e.g., coordinate location) relative to the image. The reference point selector 314 may use the same reference point for all of the angles (e.g., all of the plotted lines) for a particular pixel. Alternatively, the reference point selector 314 may select which reference point to use (e.g., for a particular pixel, for a group of pixels, or for an image) from multiple available references points, such as a first reference point and a second reference point, as described with reference to FIGS. 4A-4B.

The distance calculator 316 may determine, for each angle, a distance from the selected reference point to the plotted line corresponding to the angle. The histogram data generator 222 may identify the distance and the corresponding angle as an angle-distance pair that is included in the histogram data 262. In some embodiments, the histogram data 262 may be associated with a 2D angle-distance histogram. When the image data 110 is divided into multiple groups of image data (e.g., multiple groups of pixels), the histogram data 262 may include multiple groups of histogram data that each correspond to a different group of pixels (e.g., a different tile) of the image.

When a tiling approach is used to split the image data 110 into smaller groups of data that each correspond to a different tile of the image, the histogram data generator 222 may be able to process each group of data separately. Accordingly, the histogram data generator 222 may generate a group of histogram data for each group of pixels (e.g., each tile) processed by the histogram data generator 222. The histogram data generator 222 may be configured to process each group of data serially (e.g., one after the other) or in parallel.

The line segment identifier 226 may receive the histogram data 262 and may generate the line segment data 128 that identifies one or more candidate line segments associated with the image. For example, the line segment identifier 226 may process each group of histogram data included in the histogram data 262. For each group of histogram data, the line segment identifier 226 may determine whether a group of pixels corresponding to the group of histogram data includes one or more candidate line segments. If the line segment identifier 226 identifiers one or more candidate line segments based on a particular group of histogram data (e.g., corresponding to a particular group of pixels), the line segment identifier 226 may generate a group candidate line segment data that corresponds to the particular group of pixels. Each group of candidate line segment data may identify one or more candidate line segments associated with a corresponding group of pixels (e.g., a corresponding tile). The line segment identifier 226 may include each group of candidate line segment data in the line segment data 128. Accordingly, the line segment data 128 may include one or more groups of candidate line segment data associated with the image. To illustrate, referring to the first example 380, a the line segment data 128 may include first group of candidate line segment data corresponding to the first tile (1) (e.g., the first group of pixels) and may include second group of candidate line segment data corresponding to the second tile (2) (e.g., the second group of pixels). The line segment data 128, such as one or more groups of candidate line segment data, may be provided to the merger logic 124 of FIG. 1 or the line segment merger 224 of FIG. 2.

During operation, the histogram data generator 222 may receive the image data 110 for one or more groups of pixels of an image. Based on the image data 110, the histogram data generator 222 may generate the histogram data 262. For example, the histogram data 262 may include multiple groups of histogram data, where each group of histogram data corresponds to a different group of pixels.

The line segment identifier 226 may receive the histogram data 262. For each group of histogram data included in the histogram data 262, the line segment identifier 226 may generate identify a corresponding group of candidate line segments (e.g., one or more candidate line segments associated with a group of pixels that correspond to group of histogram data). The line segment identifier 226 may generate the line segment data 128 based on each identified group of candidate line segments.

An amount of overlap between neighbor tiles may be user selectable. For example, a user may be able to select neighboring tiles to overlap or not to overlap. In some embodiments, an amount (e.g., a percentage) of overlap between neighboring tiles may be user defined. For example, a user may be able to define a relative percentage of overlap between two neighboring tiles, such as 0%, 5%, 8.5%, etc. Alternatively, or in addition, a first amount of overlap between neighboring tiles in a horizontal direction may be different than a second amount of overlap between neighboring tiles in a vertical direction.

When line detection is performed, such as by the system 100 of FIG. 1, the system 200 of FIG. 2A, or the system 300 of FIG. 3, an amount of histogram data (e.g., a size of a 2D histogram) may be related to a size of an image. For an image having a resolution of 2 Megapixels, a relatively large amount of 2D histogram data may be generated and stored in a memory space, such as main memory. A processing core, such as the first processing core 130 of FIG. 1, may then perform an exhaustive search inside the memory space to identify one or more candidate line segments based on the 2D histogram data. To reduce an amount of the histogram data (e.g., a size of the 2D histogram) and to enable the histogram data to be generated and/or stored in a cache memory (e.g., the cache memory 260 of FIG. 2A), one or more techniques, such as tiling (e.g., dividing an image into multiple groups of pixels, as described herein), may be implemented to process the image data 110.

For example, given an image having a size of M×N pixels, where M and N are each positive integers, tiling may be used to optimize (e.g., simplify) a histogram building process and to reduce an amount of histogram data (e.g., a size of a histogram, such as a 2D histogram). A size of a baseline histogram of the entire image may be determined based on a multiplication of a number of angles used to calculate the number of possible values for the line distance. For example, when a resolution includes 180 angles, a range of line distances may be [−max(M,N), sqrt($M^2+N^2$)]. Accordingly, an overall 2D histogram size (i.e., the baseline histogram size) may be equal to: 180×(max(M,N)+sqrt($M^2+N^2$)). Using the tiling approach, the image can be divided into multiple tiles and a 2D histogram may be built for each tile. A number of angles that would be searched for each tile may be reduced and a range of possible line distances may be reduced. For example, for a tile size of K×K pixels, where K is a positive integer, assuming K<<M, K<<N, the number of angles may be set to 64. Thus, the 2D histogram size is: 64×(K+sqrt($2K^2$))=64×(1+sqrt(2))×K≅155K. In a particular embodiment, K may be equal to 32.

Additionally or alternatively, a proposed distance measuring technique, as described with reference to FIGS. 4A-4B, may be used to reduce a range of calculated distance values and to compress a size of the 2D histogram. Typically, to generate a 2D histogram (e.g., an angle-distance histogram), each distance value included in a range of distance values based on a single reference point, such as a corner of the image. Using the single reference point, the range of distance values calculated for a group of pixels of an image may be quite large. The proposed distance measuring technique may reduce the range of distance values by selecting from (e.g., using) multiple reference points as compared to a single reference point. For example, distances corresponding to angles that are between 0-90 degrees $$\left(\text{e.g., } 0 - \frac{\pi}{2} \text{radians}\right)$$

may be determined from a first reference point and distances corresponding to angles between 90-180 degrees $$\left(\text{e.g., } \frac{\pi}{2} - \pi \text{ radians}\right)$$

may be determined from a second reference point, as described with reference to FIGS. 4A-4B. When tiling is used with the number angles set to 64, as described above, the size of the histogram per tile may be reduced to: 64×sqrt($2K^2$)≅91K. The proposed distance measuring my reduce the range of applicable distances and may reduce a size of the 2D histogram size as compared to techniques that use a single reference point.

By using tiling and/or the proposed distance measuring technique, an amount of generated histogram data (e.g., a size of a 2D histogram) may fit entirely in a cache memory, such as an L2 cache memory (e.g., the memory 260), without having to store a portion of the histogram data in a main memory. For example, particular histogram data generated for a particular tile (e.g., a particular group of pixels) may fit entirely in a cache memory. Storing the particular histogram data (corresponding to the particular tile) entirely in the cache memory without having to access the main memory may increase an overall speed of generating the particular histogram data as compared to systems that generate histogram data that is larger than a storage capacity of a cache memory (e.g., an L2 cache memory). Additionally, by storing all of the particular histogram data in the cache memory, the line segment identifier 226 may more quickly access the particular histogram data and identify one or more candidate line segments associated with the particular group of pixels as compared to if the line segment identifier 226 had to access a main memory. By being able to save the histogram data into a cache memory, an amount of processing time and an amount of power consumed may be reduced as compared to a system that saves the histogram data to a main memory.

Referring to FIGS. 4A and 4B, diagrams illustrating use of different reference points to determine a distance (d) associated with a pixel are depicted. The FIGS. 4A and 4B may be illustrative of one or more operations performed by the Hough transform logic 122 of FIG. 1, the histogram data generator 222 of FIG. 2A, the reference point selector 314 or the distance calculator 316 of FIG. 3.

Referring to FIG. 4A, a first diagram illustrating use of a first reference point is depicted and designated 400. An image may include a group of pixels 402 that is associated with image data, such as the image data 110 of FIG. 1. The group of pixels 402 may include a pixel 410 that is selected to be processed based on a characteristic value (e.g., an intensity value, a gradient value, or a luminescence value) associated with the pixel. For example, the pixel 410 may be selected by the Hough transform logic 122 of FIG. 1, the histogram data generator 222 of FIG. 2A, or the pixel comparator 310 of FIG. 3. For the pixel 410, a through line 414 that passes through the pixel 410 may be established. The through line 414 may be at an angle ($\alpha$) relative to a reference line 412, such as a vertical line. Based on the angle ($\alpha$), a reference point may be selected to be used to determine a distance (d) (e.g., a shortest distance) from the selected reference point to the through line 414. For example, a first reference point 430 (e.g., an upper left hand corner of the group of pixels 402) may be selected when the angle ($\alpha$) has an angle value that is included in a first group of angles (e.g., angles having a value between 0-90 degrees). A distance value of the distance (d) may be determined based on the first reference point 430 and the distance value and the angle value may be used to generate histogram data (e.g., an angle-distance pair of a 2D histogram that corresponds to the group of pixels 402).

Referring to FIG. 4B, a second diagram illustrating use of a second reference point is depicted and designated 450. A through line 416 may be established that crosses the pixel 410. An angle ($\alpha$) of the through line 416 relative to the reference line 412 may be determined and a reference point may be selected based on the angle ($\alpha$). For example, a second reference point 470 (e.g., an upper right hand corner of the group of pixels 402) may be selected when the angle ($\alpha$) has an angle value that is included in a first group of angles (e.g., angles having a value between 90-180 degrees). A distance value of the distance (d) may be determined based on the second reference point 470 and the distance value and the angle value may be used to generate histogram data (e.g., an angle-distance pair of a 2D histogram that corresponds to the group of pixels 402).

By selecting the reference point based on the angle, a range of distance values calculated based on the pixel 410 may be limited and an amount of histogram data (e.g., a size of the 2D histogram) may be reduced. By reducing the size of the 2D histogram, a of a local maximum search operation performed may be reduced (e.g., there may be less histogram bins that need to be processed by a line segment identifier, such as the Hough transform logic 122 of FIG. 1 or the line segment identifier 226).

Figure 5:
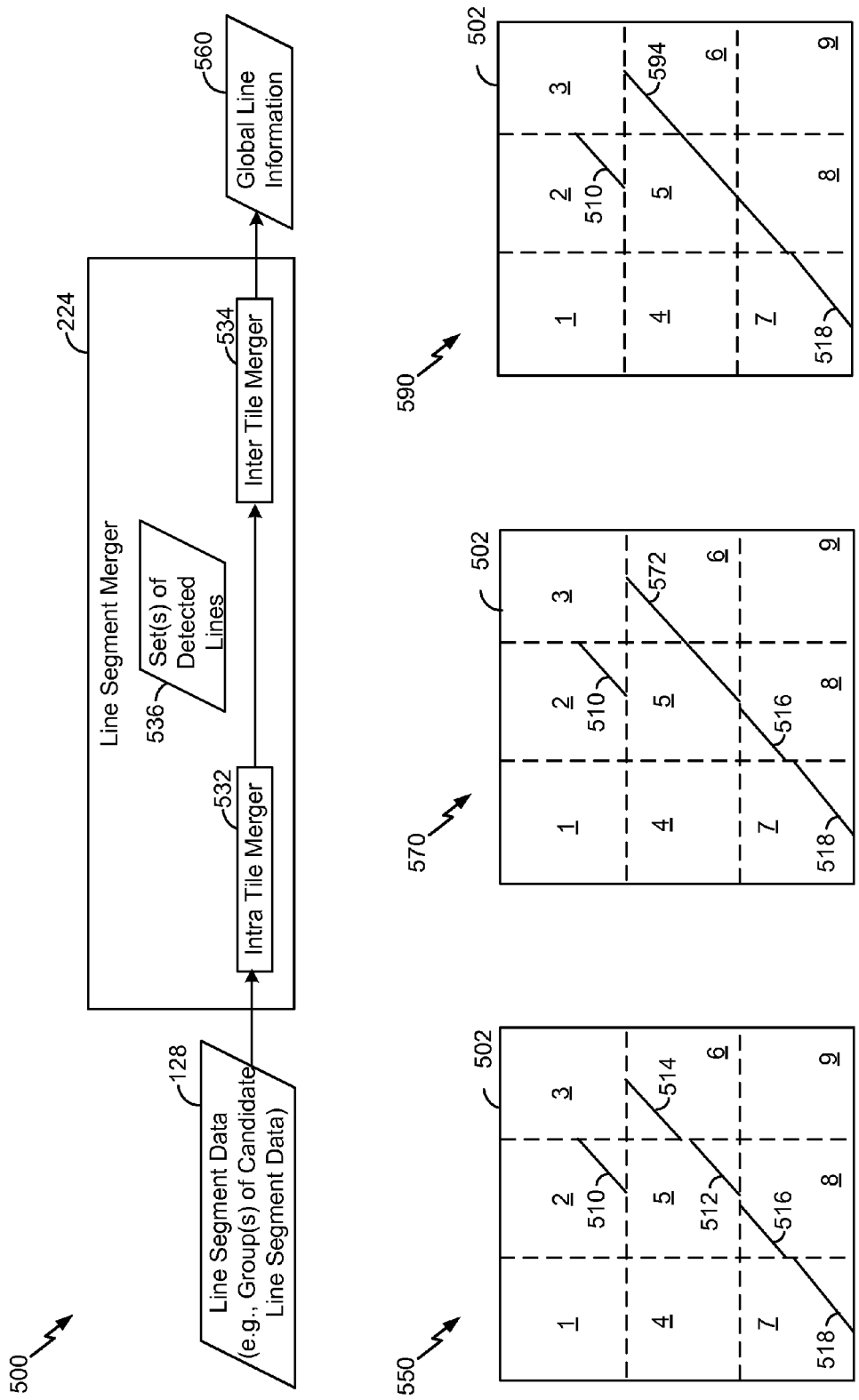
FIG. 5 is a diagram of an illustrative system for processing line segment data to generate line information associated with an image.

Referring to FIG. 5, an illustrative embodiment of a system 500 operable to process line segment data to detect global line information in an image is shown. The system 500 may include the line segment merger 224. The system 500 may include or correspond to the system 100 of FIG. 1 or the system 200 of FIG. 2. Additionally, the system 500 may be coupled to the system 300 of FIG. 3.

The line segment merger 224 may include an intra tile merger 532 and an inter tile merger 534. The line segment merger 224 may receive the line segment data 128 from the line segment identifier 226 and provide the line segment data 128 to the intra tile merger 532.

The intra tile merger 532 may be configured to process the line segment data 128 to generate one or more sets of detected lines 536. For example, the one or more sets of detected lines 536 may include or correspond to the set of detected lines 150 of FIG. 1. The one or more sets of detected lines 536 may identify one or more detected lines associated with a group of pixels of the image. When the line segment data 128 includes multiple groups of candidate line segment data, the intra tile merger 532 may process each group of candidate line segment data to identify set of detected lines. For example, the intra tile merger 532 may operate to detect one or more lines included in a particular group of pixels as described with reference to the merger logic 124 of FIG. 1. For example, the intra tile merger 532 may merge (e.g., consolidate) one or more detected candidate lines associated with the particular group of pixels to generated a detected line segment (e.g., a representative line segment) associated with the particular group of pixels.

To illustrate, the line segment data 128 may include a first group of candidate line segment data (associated with a first group of pixels of an image) and a second group of candidate line segment data (associated with a second group of pixels of the image). The intra tile merger 532 may processes the first group of candidate line segment data to generate a first set of detected lines (associated with the first group of pixels, such as a first tile). The intra tile merger 532 may process the second group of candidate line segment data to generate a second set of detected lines (associated with the second group of pixels, such as a second tile). The first set of detected lines and the second set of detected lines may be included in the one or more sets of detected lines 536. The intra tile merger 532 may provide the one or more sets of detected lines 536 to the inter tile merger. For example, the intra tile merger 532 may store the one or more sets of detected lines 536 to a memory, such as the memory 148 of FIG. 1, of the line segment merger 224 that is accessible to the inter tile merger. Each detected line segment included in the one or more sets of detected lines 536 may correspond to an entry included in the one or more sets of detected lines 536. Each detected line segment (e.g., each entry) included in the one or more sets of detected lines 536 may include a line identifier, a pixel group identifier that the detected line segment is associated with, an angle ($\alpha$) associated with the detected line segment, a distance (d) associated with the detected line segment, a slope of the detected line segment, a point (e.g., a Cartesian coordinate) that the detected line segment passes through, an endpoint of the detected line segment, a length of the detected line segment, or a combination thereof, as illustrative, non-limiting examples.

The inter tile merger 534 may process each detected line segment included in the one or more sets of detected lines 536 to generate a global line to be included in global line information 560. The global line information 560 may be associated with one or more lines (e.g., line segments) detected in the image. When trying to generate a global line from a particular detected line segment within a particular tile, the inter tile merger 534 may use a search method based on a depth first search (DFS) principle. For example, the inter tile merger 534 may start from each end point of the particular detected line segment and iteratively search for matching detected line segments to be concatenated (e.g., merged) with the particular detected line segment. To illustrate, the inter tile merger 534 may use a search pattern that is based on an angle and/or a slope of a particular detected line segment (e.g., a current selected detected line segment) and a tile edge that the particular detected line segment crosses, such as an upper tile edge, a lower edge, etc. By estimating a direction in which the particular detected line segment should continue, the search pattern may enable the inter tile merger 534 to select one or more neighboring tiles which may include a matching line segment. For example, estimating the direction may include determining an orientation of the particular detected line segment. When a match is found and the merge is completed, the new line segment (e.g., the concatenated line segment) may be re-classified and a new search pattern may be selected. The process may continue until no further matching line segments can be found, as described further herein.

For example, the inter tile merger 534 may select a particular line segment included in the one or more sets of detected lines 536. The particular line segment may be included in a particular set of detected lines that is associated with a particular group of pixels (e.g., a particular tile) of the image. The inter tile merger 534 may determine whether the particular line segment may be concatenated (e.g., merged) with one or more other line segments included in the one or more sets of detected lines 536. The one or more other line segments may be included in one or more groups of pixels of the image other than the particular group of pixels. If the particular line segment cannot be concatenated with one or more other line segments, the inter tile merger 534 may identify the particular line segment as a global line (e.g., a global line segment). If the particular line segment can be concatenated, the inter tile merger 534 may concatenate the particular line segment with the one or more other line segments to generate a concatenated line segment (e.g., a merged line segment) that spans multiple tiles, as described further herein. The inter tile merger 534 may identify the concatenated line segment as a global line.

The inter tile merger 534 may track each line each of the line segments included in the one or more sets of detected lines 536 so that each line segment is only used once to generate a global line. For each global line generated, the inter tile merger 534 may mark (e.g., flag) the one or more line segments (or one or more corresponding entries of the one or more sets of detected lines 536) used to identify the global line. Line segments included in the one or more sets of detected lines 536 that are flagged may not be used to generate a global line.

To illustrate, the inter tile merger 534 may include the one or more sets of detected lines 536 that is associated with one or more groups of pixels of an image 502, as illustrated at 550. The image 502 may include multiple groups of pixels (e.g., multiple tiles), such as tiles (1)-(9). The one or more sets of detected lines 536 may identify multiple detected line segments 510-518. For example, the one or more sets of detected lines 536 may identify a first detected line segment 510 associated with a second tile (2), a second detected line segment 512 associated with a fifth tile (5), a third detected line segment 514 associated with a sixth tile (6), a fourth detected line segment 516 associated with an eighth tile (8), and a fifth detected line segment associated with a seventh tile (7).

The inter tile merger 534 may select a particular detected line segment, such as the first detected line segment 510, from the one or more sets of detected lines 536. The inter tile merger 534 may determine an angle and/or a slope of the first detected line segment 510 based on data included in the one or more sets of detected lines 536. Based on the angle and/or slope of the first detected line segment 510, the inter tile merger 534 may identify, in a first direction (e.g., to the right), one or more tiles that are adjacent to the second tile (2) associated with the first detected line segment 510. For example, the inter tile merger 534 may identify the third tile (3).

The inter tile merger 534 may determine whether the third tile (3) is associated with one or more detected lines included in the one or more sets of detected lines 536. Based on a determination that the third tile (3) is not associated with one or more detected lines, the inter tile merger 534 may identify a second direction (e.g., generally to the left of the third tile (3) or generally downward of the third tile (3)) of the second tile (2) based on the angle and/or slope of the first detected line segment 510. For example, the inter tile merger 534 may identify the fifth tile (5).

The inter tile merger 534 may determine whether the fifth tile (5) is associated with one or more detected lines included in the one or more sets of detected lines 536. Based on a determination that the fifth tile (5) is associated with one or more detected lines, such as the second detected line segment 512, the inter tile merger 534 may compare the angle and/or the slope of the first detected line segment 510 to an angle and/or a slope of each of the one or more detected lines associated with the fifth tile (5). For example, the inter tile merger 534 may compare the angle of the first detected line segment 510 to the angle of the second detected line segment 512 to determine whether the angles are similar. To illustrate inter tile merger 534 may determine that the angles are similar if the angle of the second detected line segment 512 is within a range of the angle of the first detected line segment 510, such as a predetermined range based on the particular angle value (e.g., ±5 degrees) or a range based on a percentage (e.g., ±5%) of a range of angle values (e.g., 0-180 degrees). Based on a determination that the angles are not similar, the inter tile merger 534 may not consider the second detected line segment 512 as an option to be concatenated with the first detected line segment 510. Based on a determination that the angles are similar, the inter tile merger 534 may consider the second detected line segment 512 as an option to be concatenated with the first detected line segment 510.

For each detected line segment (e.g., the second detected line segment 512) having an angle that is similar to the first detected line segment 510, the inter tile merger 534 may determine a distance (in pixels) between an endpoint of the first detected line segment 510 and an endpoint of each detected line segment (e.g., the second detected line segment 512) having an angle that is similar to the first detected line segment 510. The inter tile merger 534 may identify a detected line segment associated with the fifth tile (5) that is a shortest distance from the first detected line segment 510. For example, the inter tile merger 534 may identify the second detected line segment 512 as having the shortest distance from the first detected line segment 510. Detected line segments that do not have the shortest distance may not be considered as options to be concatenated with the first detected line segment 510.

The inter tile merger 534 may determine whether the distance between the first detected line segment 510 and the second detected line segment 512 satisfies (e.g., is less than or equal to) a threshold distance (e.g., a threshold number of pixels). If the distance satisfies the threshold distance, the inter tile merger 534 may concatenate the first detected line segment 510 and the second detected line segment 512, as described further herein. If the distance does not satisfy the threshold distance, the inter tile merger 534 may not concatenate the first detected line segment 510 and the second detected line segment 512. For example, based on a comparison of a distance between endpoints of the first detected line segment 510 and the second detected line segment 512, the inter tile merger 534 may determine not to concatenate the first detected line segment 510 and the second detected line segment 512.

After determining that the first detected line segment 510 cannot be concatenated with detected line segments in either direction (e.g., directions corresponding to opposing endpoints of the first detected line segment 510), the inter tile merger 534 may identify the first detected line segment 510 as a global line, such as a global line segment associated with the image 502. For example, the inter tile merger 534 may include the first detected line segment 510 in the global line information 560. To illustrate, the first detected line segment 510 may be included as an entry in the global line information 560.

Each entry included in the global line information may include a line identifier associated with a corresponding global line, an angle (α) associated with the corresponding global line, a distance (d) associated with the corresponding global line, a slope of the corresponding global line, a point (e.g., a Cartesian coordinate) that the corresponding global line passes through, one or more endpoints of the corresponding global line, or a combination thereof, as illustrative, non-limiting examples. After processing the first detected line segment 510, the inter tile merger 534 may mark the first detected line segment 510 as processed and may select the second detected line segment 512 associated with the fifth tile (5).

The inter tile merger 534 may determine an angle and/or a slope of the second detected line segment 512 based on data included in the one or more sets of detected lines 536. Based on the angle and/or slope of the second detected line segment 512, the inter tile merger 534 may identify, in a first direction (e.g., to the right), one or more tiles that are adjacent to the fifth tile (5) associated with the second detected line segment 512. For example, the inter tile merger 534 may identify the sixth tile (6).

The inter tile merger 534 may determine whether the sixth tile (6) is associated with one or more detected lines included in the one or more sets of detected lines 536. Based on a determination that the sixth tile (6) is associated with one or more detected lines, such as the third detected line segment 514, the inter tile merger 534 may compare the angle and/or the slope of the second detected line segment 512 to an angle and/or a slope of each of the one or more detected lines associated with the sixth tile (6). For example, the inter tile merger 534 may compare the angle of the second detected line segment 512 to the angle of the third detected line segment 514 to determine whether the angles are similar. Based on a determination that the angles are similar, the inter tile merger 534 may consider the third detected line segment 514 as an option to be concatenated with the second detected line segment 512.

For each detected line segment (e.g., the third detected line segment 514), associated with the sixth tile (6), having an angle that is similar to the second detected line segment 512, the inter tile merger 534 may determine a distance (in pixels) between an endpoint of the second detected line segment 512 and an endpoint of each detected line segment (e.g., the third detected line segment 514) having an angle that is similar to the second detected line segment 512. The inter tile merger 534 may identify a detected line segment associated with the sixth tile (6) that is a shortest distance from the second detected line segment 512. For example, the inter tile merger 534 may identify the third detected line segment 514, associated with the sixth tile (6), as having the shortest distance from the second detected line segment 512. Detected line segments that do not have the shortest distance may not be considered as options to be concatenated with the second detected line segment 512

The inter tile merger 534 may determine whether the distance between the second detected line segment 512 and the third detected line segment 514 satisfies the threshold distance. If the distance satisfies the threshold distance, the inter tile merger 534 may concatenate the first detected line segment 510 and the second detected line segment 512, as described further herein. For example, based on a comparison of a distance between endpoints of the second detected line segment 512 and the third detected line segment 514, the inter tile merger 534 may determine to concatenate the second detected line segment 512 and the third detected line segment 514.

Based on a determination to concatenate (e.g., merge) the second detected line segment 512 and the third detected line segment 514, the inter tile merger 534 may determine (e.g., identify or generate) first and second endpoint data for each of the second detected line segment 512 and the third detected line segment 514. For example, the inter tile merger 534 may identify the first and second endpoint data for each of the second detected line segment 512 and the third detected line segment 514 based on data included in the one or more sets of detected lines 536. The inter tile merger 534 may concatenate the second detected line segment 512 and the third detected line segment 514 by performing a linear regression using the first and second endpoint data for each of the second detected line segment 512 and the third detected line segment 514. For example, the inter tile merger 534 may generate a first concatenated line segment 572 associated with the image 502, as illustrated at 570.

The inter tile merger 534 may determine line information corresponding to the first concatenated line segment 572, such as a line identifier associated with the first concatenated line segment 572, an angle (α) associated with the first concatenated line segment 572, a distance (d) associated with the first concatenated line segment 572, a slope of the first concatenated line segment 572, a point (e.g., a Cartesian coordinate) that the first concatenated line segment 572 passes through, one or more endpoints of the first concatenated line segment 572, or a combination thereof, as illustrative, non-limiting examples. After generating the first concatenated line segment 572, the inter tile merger 534 may continue processing of the second detected line segment 512 based on the first concatenated line segment 572.

The inter tile merger 534 may determine an angle and/or a slope of the first concatenated line segment 572. Based on the angle and/or slope of the first concatenated line segment 572, the inter tile merger 534 may identify, in a first direction (e.g., to the right) associated with the first concatenated line segment 572, one or more tiles that are adjacent to the sixth tile (6) associated with the first concatenated line segment 572. For example, the inter tile merger 534 may identify the third tile (3). The inter tile merger 534 may determine whether the third tile (3) is associated with one or more detected lines included in the one or more sets of detected lines 536. Based on a determination that the third tile (3) is not associated with one or more detected lines, the inter tile merger 534 may identify a second direction (e.g., to the left) associated with the first concatenated line segment 572 based on the angle and/or slope of the associated with the first concatenated line segment 572. For example, the inter tile merger 534 may identify the eighth tile (8) as being adjacent to the fifth tile (5) associated with the first concatenated line segment 572.

The inter tile merger 534 may determine whether the eighth tile (8) is associated with one or more detected lines included in the one or more sets of detected lines 536. Based on a determination that the eighth tile (8) is associated with one or more detected lines, such as the fourth detected line segment 516, the inter tile merger 534 may compare the angle and/or the slope of the first concatenated line segment 572 to an angle and/or a slope of each of the one or more detected lines associated with the eighth tile (8). For example, the inter tile merger 534 may compare the angle of the first concatenated line segment 572 to the angle of the fourth detected line segment 516 to determine whether the angles are similar. Based on a determination that the angles are similar, the inter tile merger 534 may consider the fourth detected line segment 516 as an option to be concatenated with the first concatenated line segment 572.

The inter tile merger 534 may determine whether a distance between the first concatenated line segment 572 (e.g., an endpoint of the first concatenated line segment 572) and the fourth detected line segment 516 (e.g., an endpoint of the fourth detected line segment 156) satisfies threshold distance (e.g., a threshold number of pixels). Based on a determination that distance satisfies (e.g., is less than or equal to) the threshold distance, the inter tile merger 534 may determine to concatenate (e.g., merge) the first concatenated line segment 572 and the fourth detected line segment 516. The inter tile merger 534 may identify first and second endpoint data for each of the first concatenated line segment 572 and the fourth detected line segment 516 and may perform a linear regression using the first and second endpoint data for each of the first concatenated line segment 572 and the fourth detected line segment 516. For example, the inter tile merger 534 may generate a second concatenated line segment 594 associated with the image 502, as illustrated at 590. The inter tile merger 534 may determine line information corresponding to the second concatenated line segment 594. After generating the first concatenated line segment 572, the inter tile merger 534 may continue processing of the second detected line segment 512 based on the second concatenated line segment 594.

The inter tile merger 534 may determine an angle and/or a slope of the second concatenated line segment 594. Based on the angle and/or slope of the second concatenated line segment 594, the inter tile merger 534 may identify, in the second direction (e.g., to the left) associated with the second concatenated line segment 594, one or more tiles that are adjacent to the eighth tile (8) associated with the second concatenated line segment 594. For example, the inter tile merger 534 may identify the seventh tile (7).

The inter tile merger 534 may identify the fifth detected line segment 518 associated with the eighth tile (8). Based on a determination that an angle of the second concatenate line segment 594 is similar to an angle of the fifth detected line segment 518, the inter tile merger 534 may consider the fifth detected line segment 518 as an option to be concatenated with the second concatenated line segment 594. When the fifth detected line segment 518 is determined to a closest detected line, associated with the seventh tile (7), to the second concatenated line segment 594, the inter tile merger 534 may further determine whether a distance between the second concatenated line segment 594 and the fifth detected line segment 518 satisfies the threshold distance. When the distance satisfies the threshold distance, the inter tile merger 534 may concatenate the second concatenated line segment 594 and the fifth detected line segment 518 to generate a third concatenated line segment. The inter tile merger 534 may determine line information corresponding to the third concatenated line segment. After generating the third concatenated line segment, the inter tile merger 534 may continue processing of the second detected line segment 512 based on the third concatenated line segment.

The inter tile merger 534 may determine an angle and/or a slope of the third concatenated line segment and may determine that there are no adjacent tiles in the second direction (e.g., to the left of the seventh tile (7)) associated with the third concatenated line segment. Accordingly, the inter tile merger 534 may identify the third concatenated line segment as a second global line, such as a second global line segment associated with the image 502. For example, the inter tile merger 534 may include the third concatenated line segment in the global line information 560. To illustrate, the third concatenated line segment may be included as an entry in the global line information 560. In association with identifying the second global line, the inter tile merger 534 may mark the second detected line segment 512, the third detected line segment 514, the fourth detected line segment 516, and the fifth detected line segment 518 as processed. For example, the inter tile merger 534 may make each detected line segment when it is used in a concatenation operation or may mark each of the detected line segments used to generate the second global line segment after the second global line segment is identified.

The global line information 560 (e.g., one or more global line segments) may be provided to a memory (not illustrated), such as a cache memory corresponding to the second processing core 140 of FIG. 1. Alternatively or additionally, the global line information may be stored in a main memory of a device, such as a mobile device, that includes the system 500. The memory may be configured to receive and to store the global line information 560. The memory may include a volatile memory and/or a non-volatile memory. The global line information 560 may be used to detect and/or track a line segment and/or a shape included in one or more images, such as a sequence of images that include the image 502. For example, the global line information 560 may be accessible to an application associated with the device that includes the system 300.

In some embodiments, the intra tile merger 532 and/or the inter tile merger 534 (e.g., the line segment merger 224) may use weights (e.g., weighted averaging) for combining one or more line segments. To illustrate, the inter tile merger 534 may use weights when combining detected line segments across tiles and/or when combining a concatenated line segment and a detected line segment across tiles, such as when the linear regression is performed. For example, weights (e.g., multipliers) may be applied based one a length (e.g., a length between endpoint coordinates) of detected line segments to be concatenated (e.g., merged), such that long detected line segments are more dominant than short detected line segments. The weighted averaging may contribute to better accuracy of a generated concatenated line segment.

In some embodiments, the inter tile merger 534 may identify multiple adjacent (e.g., neighboring) tiles in a single direction (e.g., to the right or to the left) when attempting to identify a detected line segment to use in a concatenation operation. For example, the inter tile merger 534 may identify two or three neighboring tiles, such as a tile in a lateral direction (e.g., horizontal or vertical) and a tile in a diagonal direction. The inter tile merger 534 may identify multiple adjacent tiles regardless of whether tiles associated with an image overlap. Additionally, when the tiles associated with the image overlap, the inter tile merger 534 may have a higher certainty that one or more potential detected line segments to use in a concatenation operation are identified, such as potential detected line segments that may be included in a diagonal neighboring tile.

By performing an intra tile merging operation prior to an inter tile merging operation, detected line segments within each tile may be consolidated prior to merging detected line segments across multiple tiles. By consolidating the detected line segments, a number of detected line segments to be processed by the inter tile merger 534 may be reduced and thus a speed of identifying one or more global lines associated with an image may be increased.

Figure 6:
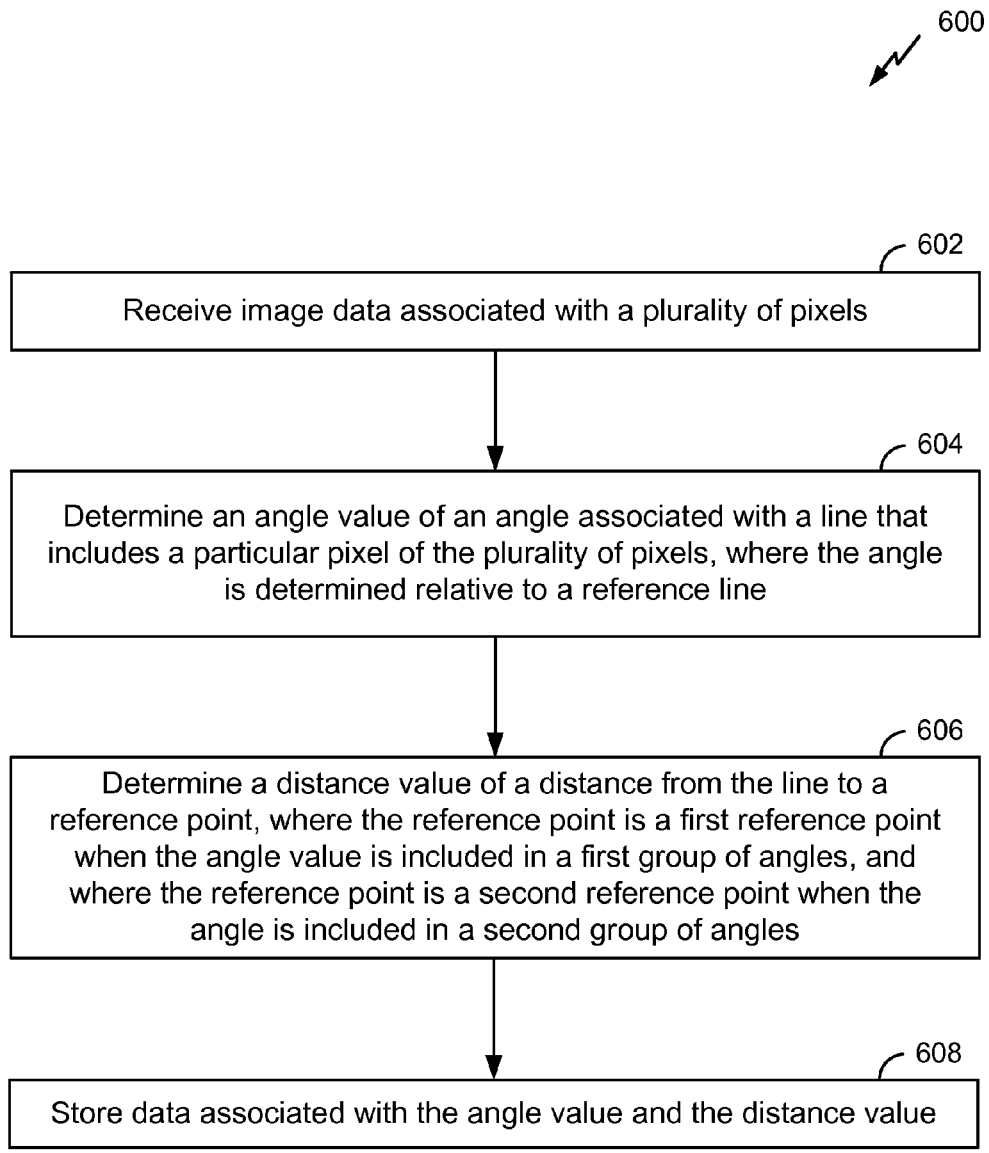
FIG. 6 is a flow diagram of an illustrative embodiment of a method of generating histogram data.

Referring to FIG. 6, a flow diagram of a first illustrative embodiment of a method 600 of generating histogram data is depicted. The method 600 may be performed by the system 100, the first processing core 130, the Hough transform logic 122 of FIG. 1, the system 200, the histogram data generator 222 of FIG. 2A, or the system 300 of FIG. 3. For example, the histogram data may include or correspond to the histogram data 262 of FIG. 2A.

The method 600 may include receiving image data associated with a plurality of pixels, at 602. For example, the image data may include or correspond to the image data 110 of FIG. 1. The image data may be received by one or more processing cores or processors. For example, the image data may be received by a first processing core, such as the first processing core 130 of FIG. 1, included in a first processor. The first processor may include a graphical processing unit (GPU) or a digital processing unit (DPS). In a particular embodiment, the image data may be received via a pixel group selector, such as the pixel group selector 306 of FIG. 1.

The method 600 may further include determining an angle value of an angle associated with a line that includes a particular pixel of the plurality of pixels, where the angle is determined relative to a reference line, at 704. For example, referring to FIGS. 4A-4B, the particular pixel of the plurality of pixels may include or correspond to the pixel 410 of the group of pixels 402. Additionally, the reference line may include or correspond to the reference line 412.

The method 600 may also include determining a distance value of a distance from the line to a reference point, where the reference point is a first reference point when the angle value is included in a first group of angles, and where the reference point is a second reference point when the angle is included in a second group of angles, at 606. For example, the distance value may be determined by the distance calculator 316 of FIG. 3. The reference point may be selected as the first reference point or the second reference point by a reference point selector, such as the reference point selector 314 of FIG. 3. Referring to FIGS. 4A-4B, the first reference point and the second reference point may include or correspond to the first reference point 430 and the second reference point 470, respectively.

The method 600 may further include storing data associated with the angle value and the distance value, at 608. The data may include or correspond to histogram data, such as the histogram data 262 of FIG. 2A. For example, the angle value and the distance value (e.g., an angle-distance pair) may be used to identify and increment a value of a relevant histogram bin that corresponds to the histogram data. The histogram data may be stored in a memory, such as the memory 260 of FIG. 2A.

By using the method 600 which selects from multiple reference points to generate the data (e.g., histogram data), an amount of generated histogram data (e.g., a size of a 2D histogram) may be reduced as compared to other methods that use a single reference point to generate histogram data. By reducing the amount of generated histogram data, the histogram data may fit entirely in a cache memory, such as an L2 cache memory, without having to store a portion of the histogram data in a main memory. Storing the particular histogram data (corresponding to the particular tile) entirely in the cache memory without having to access the main memory may increase an overall speed of generating the particular histogram data as compared to systems that generate histogram data that is larger than a storage capacity of a cache memory (e.g., an L2 cache memory).

Figure 7:
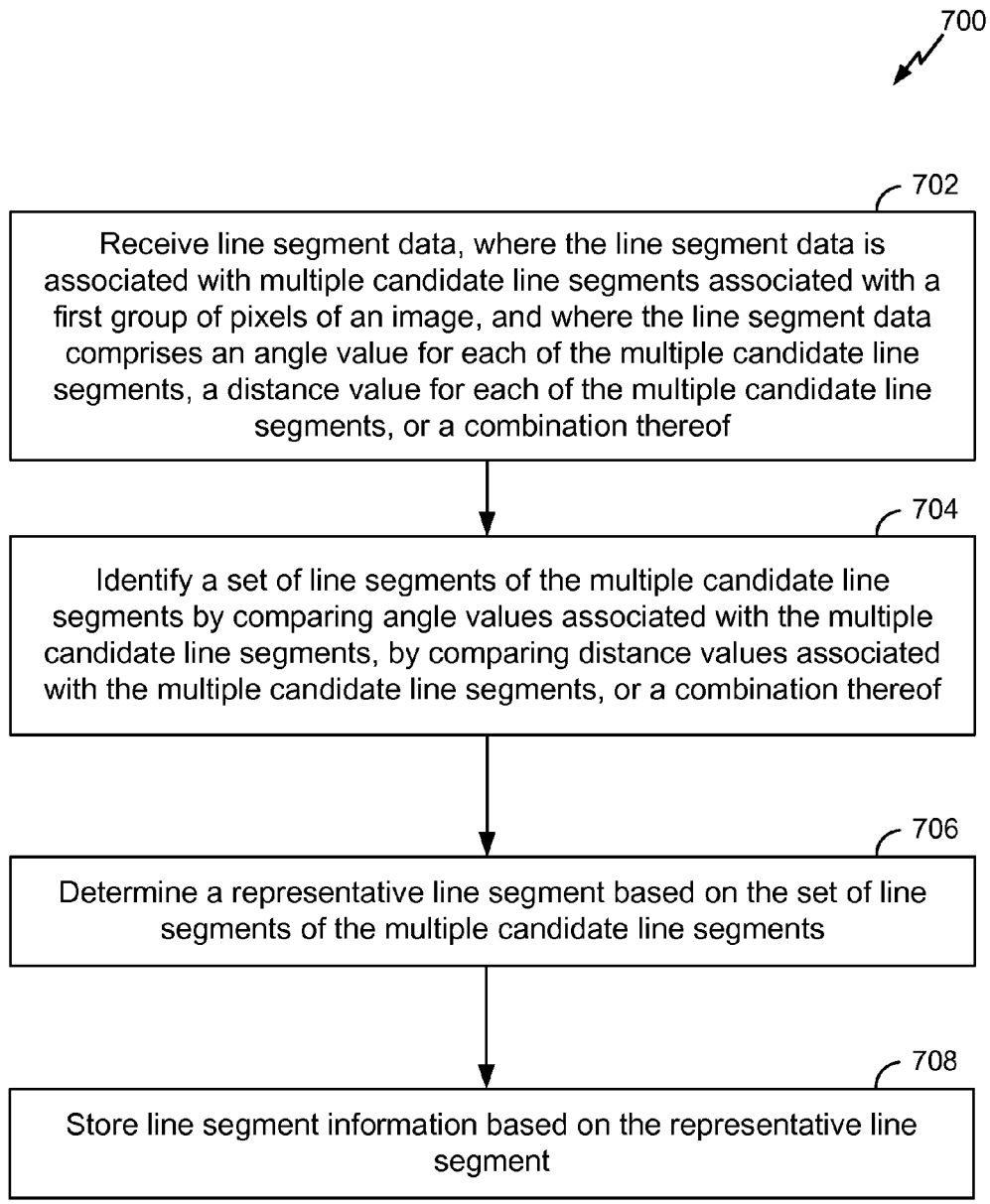
FIG. 7 is a flow diagram of an illustrative embodiment of a method of generating line segment information.

Referring to FIG. 7, a flow diagram of a first illustrative embodiment of a method 700 of generating line segment information is depicted. The method 700 may be performed by the system 100, the second processing core 140, the merge logic 124 of FIG. 1, the system 200, the line segment merger 224 of FIG. 2A, the system 500, the intra tile merger 532, or the inter tile merger 534 of FIG. 5. For example, the line segment information may include or correspond to the set of detected lines 150 (e.g., line segment information) of FIG. 1, the one or more sets of detected lines 536 or the global line information 560 of FIG. 5.

The method 700 may include receiving line segment data, where the line segment data is associated with multiple candidate line segments associated with a first group of pixels of an image, and where the line segment data includes an angle value for each of the multiple candidate line segments, a distance value for each of the multiple candidate line segments, or a combination thereof, at 702. For example, the line segment data may include or correspond to the line segment data 128 of FIG. 1. The line segment data may be generated by a first processing core, such as the first processing core 130, the Hough transform logic 122 of FIG. 1 or the line segment identifier 226 of FIG. 2A. The line segment data may be received by a second processing core, such as the second processing core 140, the merge logic 124 of FIG. 1, the line segment merger 224 of FIG. 2A, the system 500, the intra tile merger 532, or the inter tile merger 534 of FIG. 5. The first processing core and the second processing core are included in a single device, such as a mobile device.

The method 700 may further include identifying a set of line segments of the multiple candidate line segments by comparing angle values associated with the multiple candidate line segments, by comparing distance values associated with the multiple candidate line segments, or a combination thereof, at 704. For example, the angle values and/or the distance values may be compared by the second processing core 140, the merge logic 124 of FIG. 1, the line segment merger 224 of FIG. 2, or the intra tile merger 532 of FIG. 5.

The method 700 may further include determining a representative line segment based on the set of line segments of the multiple candidate line segments, at 706, and storing line segment information based on the representative line segment, at 708. The representative line segment may be determined by performing a linear regression on coordinate data associated with the set of line segments. The line segment information may include or correspond to the set of detected lines 150 (e.g., line segment information) of FIG. 1, the one or more sets of detected lines 536, or the global line information 560 of FIG. 5. The line segment information may be stored in a memory, such as the memory 148 of FIG. 1. The detected line information comprises a coordinate, such as at least one end point coordinate, associated with the representative line segment.

In some embodiments, the first processing core and the second processing core may be pipelined to process data related to multiple images, such as the images 210 of FIG. 2A. For example, the second processing core may determine the representative line segment associated with the image while the first processing core concurrently generates second candidate line segment data associated with a second image. In a particular embodiment, the first processing core may correspond to (e.g., be included in) a graphical processing unit (GPU) and the second processing core corresponds to (e.g., be included in) a central processing unit (CPU). For example, the GPU may be configured to generate two-dimensional (2D) histogram data associated with the first group of pixels during a first stage of a pipeline and to identify candidate line segment data based on the 2D histogram data during a second stage of the pipeline. The CPU may be configured to merge multiple candidate line segments based on the candidate line segment data to determine the representative line segment during a third stage of the pipeline. The first stage may be followed by the second stage and the second stage may be followed by the third stage.

The first processing core, such as a graphical processing unit (GPU), may be to receive image data, such as the image data 110 of FIG. 1, corresponding to the image. The GPU may be configured to generate two-dimensional (2D) histogram data (associated with an angle-distance 2D histogram), such as one or more angle-distance pairs. To illustrate, for a particular pixel included in a first group of pixels, the GPU may determine an angle value of an angle associated with a candidate line segment that includes the particular pixel and may determine a distance value of a distance from the particular pixel to a reference point. The angle may be determined relative to a reference line that passes through the particular pixel. For example, a first reference point may be used as the reference point when the angle value is included in a first group of angles and a second reference point may be used as the reference point when the angle value is included in a second group of angles. The GPU may further be configured to determine candidate line segment data, such as the line segment data 128 of FIG. 1, based on the 2D histogram data. To illustrate, a particular distance value and a particular angle value corresponding to a particular candidate line segment may be determined based on angle-distance two-dimensional (2D) histogram data generated by the first processing core (e.g., the GPU).

The image may be divided into the first group of pixels and a second group of pixels. In a particular embodiment, a first portion of a first region corresponding to the first group of pixels overlaps a second portion of a second region corresponding to the second group of pixels. The representative line segment may be merged with a particular detected line segment associated with the second group of pixels to generate a merged line segment (e.g., a concatenated line segment). The second group of pixels of the image may be identified based on an orientation of the representative line segment. To illustrate, the second group of pixels may be identified based on a particular angle associated with the representative line segment. The representative line segment and the particular detected line segment may be merged by performing a linear regression on first coordinate data associated with the representative line segment and second coordinate data associated with the particular detected line segment.

The method 700 may be used to merge multiple candidate line segments into a representative line segment and thus reduce an angle detection error and/or a distance detection error resulting from the performance of the Hough transform. Additionally, by performing candidate line segment detection at the first processing core and performing line merging at the second processing core, different processing cores may be selected that are best suited for a particular task.

The methods of FIGS. 6-7 may be implemented by a field-programmable gate array (FPGA) device, an application-specific integrated circuit (ASIC), a processing unit such as a graphical processing unit (GPU), a central processing unit (CPU), a digital signal processor (DSP), a controller, another hardware device, firmware device, or any combination thereof. As an example, the methods of FIG. 6-7 can be performed by one or more processors that execute instructions to detect and/or track line segments associated with one or more images.

Figure 8:
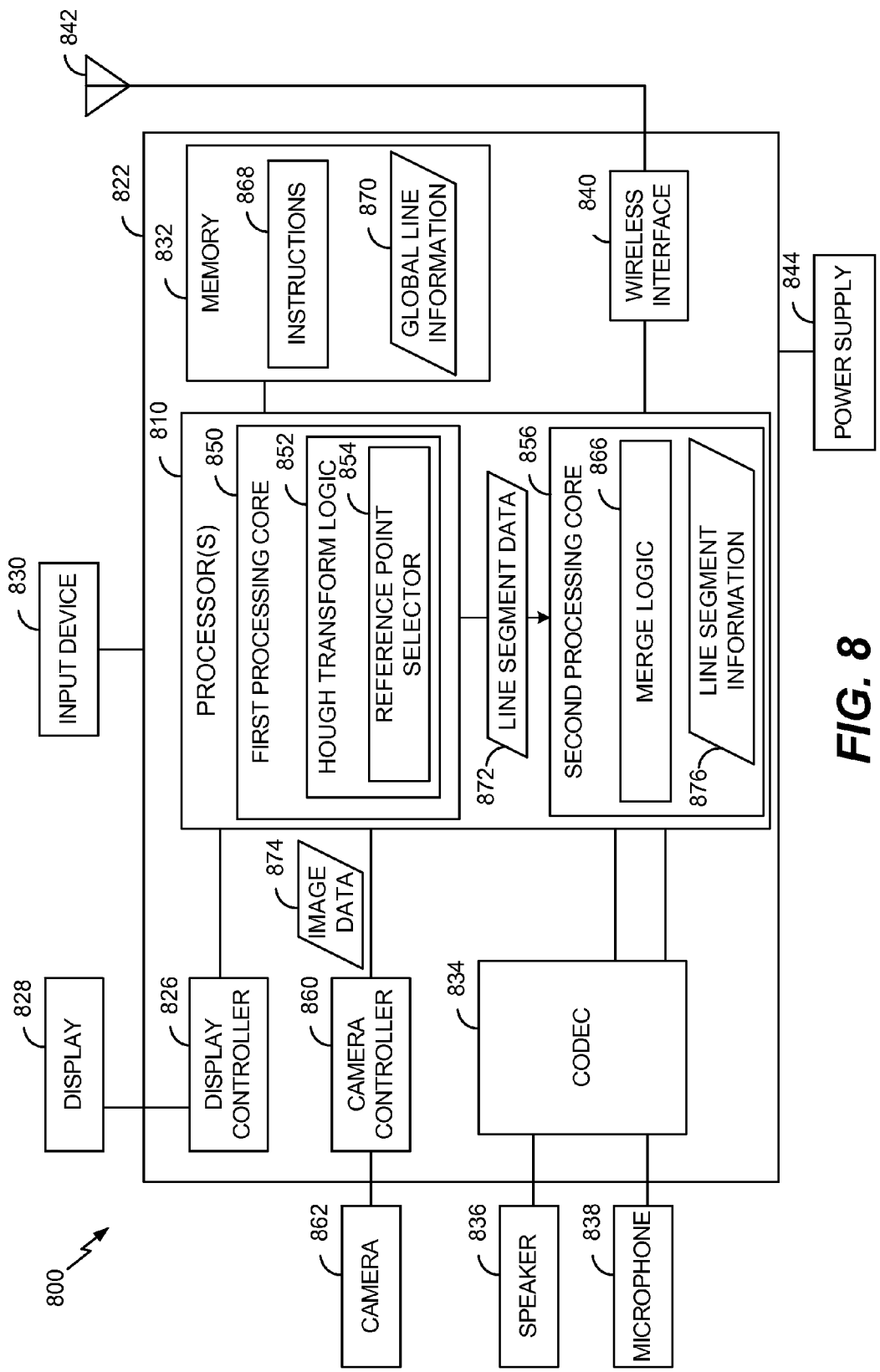
FIG. 8 is a block diagram of a device for processing image data to detect and/or track a line segment included in an image using the system of FIG. 1.

Referring to FIG. 8, a block diagram of a particular illustrative embodiment of a wireless communication device 800 is depicted. The device 800 may include the system 100 of FIG. 1, the system 200 of FIG. 2A, the system 300 of FIG. 3, the system 500 of FIG. 5, or a combination thereof.

The device 800 includes one or more processors 810 (e.g., one or more processing cores), such as a digital signal processor (DSP), a graphical processing unit (GPU), and/or a central processing unit (CPU). The one or more processors 810 may be coupled to a memory 832. The one or more processors 810 may be configured to process image data 874 associated with one or more images (e.g., one or more image frames). The one or more processors 810 may include a first processing core 850 and a second processing core 856. The first processing core 850 and the second processing core 856 may include or correspond to the first processing core 130 and the second processing core 140 of FIG. 1, respectively.

The first processing core 850 may include Hough transform logic 852. The Hough transform logic 852 may include or correspond to the Hough transform logic 122 of FIG. 1, the histogram data generator 222, the line segment identifier 226, the pixel group selector 306, the pixel comparator 310, the reference point selector 314, or the distance calculator 316 of FIG. 3. The Hough transform logic 852 may include a reference point selector 854, such as the reference point selector 314. The Hough transform logic 852 may be configured to generate line segment data 872. The line segment data 872 may include or correspond to the line segment data 128 of FIG. 1.

The second processing core 856 may be configured to process the line segment data 872. The second processing core 856 may include merge logic 866. The merge logic 866 may include or correspond to the merge logic 124 of FIG. 1, the line segment merger 224 of FIG. 2A, the intra tile merger 532, or the inter tile merger 534 of FIG. 5. The second processing core 856 (e.g., the merge logic 866) may be configured to process the line segment data 872 to generate line segment information 876 associated with one or more groups of pixels of an image. The line segment information 876 may be stored in a memory, such as a memory (e.g., a cache memory of the one or more processors 810 or a cache memory associated with the second processing core 856) or the memory 832 (e.g., a main memory). The line segment information 876 may include or correspond to the set of detected lines 150 (e.g., line segment information) of FIG. 1 or the one or more sets of detected lines 536 of FIG. 5. Additionally, the second processing core 856 (e.g., the merge logic 866) may be configured to generate global line information 870, such as the set of detected lines 150 of FIG. 1, the one or more sets of detected lines 536, the global line information 560 of FIG. 5. In a particular embodiment, the global line information 870 may include at least a portion of the line segment information 876.

The memory 832 includes instructions 868 (e.g., executable instructions), such as computer-readable instructions or processor-readable instructions, and global line information 870. The global line information 870 may include line segment information associated with one or more line segments associated with an image or a sequence of images. For example, the global line information 870 may include or correspond to the set of detected lines 150 (e.g., line segment information) of FIG. 1, the one or more sets of detected lines 536, the global line information 560 of FIG. 5, or the line segment information 876 of FIG. 8.

The instructions 868 may include one or more instructions that are executable by a computer, such as by each of the one or more processors 810. For example, the one or more instructions may be executable by the one or more processors 810, such as a particular processor, to cause the one or more processors 810 to perform operations including receiving line segment data associated with multiple candidate line segments associated with a first group of pixels of an image. The line segment data includes an angle value for each of the multiple candidate line segments, a distance value for each of the multiple candidate line segments, or a combination thereof. The instructions further cause the one or more processors 810 to perform operations including identifying a set of line segments of the multiple candidate line segments by comparing angle values associated with the multiple candidate line segments, distance values associated with the multiple candidate line segments, or a combination thereof. The instructions further cause the one or more processors 810 to perform operations including determining a representative line segment based on the set of line segments of the multiple candidate line segments and determining line segment information based on the representative line segment. In a particular embodiment, the line segment information includes at least one end point coordinate associated with the representative line segment.

FIG. 8 also shows a display controller 826 that is coupled to the one or more processors 810 and to a display 828. A coder/decoder (CODEC) 834 can also be coupled to the one or more processors 810. A speaker 836 and a microphone 838 can be coupled to the CODEC 834. The one or more processors 810 may also be coupled to a camera controller 860 that is coupled to a camera 862. The camera controller 860 may communicate image data 874, such as the image data 110 of FIG. 1, to the one or more processors 810. The image data 874 may be based on one or more images captured by the camera 862.

FIG. 8 also indicates that a wireless interface 840, such as a wireless controller, can be coupled to the one or more processors 810 and to an antenna 842. In a particular embodiment, the one or more processors 810, the display controller 826, the camera controller 860, the memory 832, the CODEC 834, and the wireless interface 840 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the antenna 842, the camera 862, and the power supply 844 are external to the system-on-chip device 822. However, each of the display 828, the camera 862, the input device 830, the speaker 836, the microphone 838, the antenna 842, and the power supply 844 can be coupled to a component of the system-on-chip device 822, such as an interface or a controller.

In conjunction with one or more of the described embodiments of FIGS. 1-8, an apparatus is disclosed that may include means for determining line segment data associated with multiple candidate line segments associated with a first group of pixels of an image. The line segment data may include an angle value for each of the multiple candidate line segments, a distance value for each of the multiple candidate line segments, or a combination thereof. The means for determining the line segment data may correspond to the one or more processing cores 120, the first processing core 130, the Hough transform logic 122 of FIG. 1, the line segment identifier 226 of FIG. 2A, the one or more processors 810, the first processing core 850, the Hough transform logic 852 of FIG. 8, one or more other structures, devices, or circuits configured to determine line segment data, or any combination thereof.

The apparatus may also include means for determining a representative line segment based on a set of line segments of the multiple candidate line segments. The means for determining the representative line segment may correspond to the one or more processing cores 120, the second processing core 140, the merge logic 124 of FIG. 1, the line segment merger 224 of FIG. 2A, the intra tile merger 532, the inter tile merger 534 of FIG. 5, the one or more processors 810, the second processing core 856, the merge logic 866 of FIG. 8, one or more other, structures, devices, or circuits configured to determine the representative line segment, or any combination thereof.

The apparatus may also include means for storing line segment information, the detected line segment data determined based on the representative line segment. The means for storing line segment information may correspond to the memory 148 of FIG. 1, the memory 832 of FIG. 8, one or more other, structures, devices, or circuits configured to store the line segment information, or any combination thereof.

One or more of the disclosed embodiments may be implemented in a system or an apparatus, such as the device 800, that may include a communications device, a fixed location data unit, a mobile location data unit, a mobile phone, a cellular phone, a satellite phone, a computer, a tablet, a portable computer, or a desktop computer. Alternatively or additionally, the device 800 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Embodiments of the disclosure may be suitably employed in any device that includes integrated circuitry including memory, a processor, and on-chip circuitry. Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single embodiment described herein should be construed as limiting and embodiments of the disclosure may be suitably combined without departing form the teachings of the disclosure.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of generating a merged line segment, the method comprising:
   receiving line segment data generated by a first processing core at a second processing core, wherein the line segment data is associated with multiple candidate line segments associated with a first group of pixels of an image, and wherein the line segment data comprises an angle value for each of the multiple candidate line segments, a distance value for each of the multiple candidate line segments, or a combination thereof;
   identifying, at the second processing core, a set of line segments of the multiple candidate line segments by comparing angle values associated with the multiple candidate line segments, by comparing distance values associated with the multiple candidate line segments, or a combination thereof;
   determining, at the second processing core, a representative line segment based on the set of line segments of the multiple candidate line segments;
   storing, by the second processing core, line segment information based on the representative line segment; and
   merging the representative line segment with a detected line segment associated with a second group of pixels of the image to generate the merged line segment.

2. The method of claim 1, wherein the line segment data further comprises a length value for each of the multiple candidate line segments, and wherein the representative line segment is determined based on length values of one or more line segments included in the set of line segments.

3. The method of claim 1, wherein the first processing core and the second processing core are included in a single device, and wherein the first processing core and the second processing core are pipelined to process data related to multiple images.

4. The method of claim 1, wherein the second processing core determines the representative line segment associated with the image while the first processing core generates second candidate line segment data associated with a second image, wherein the first processing core corresponds to a graphical processing unit (GPU), and wherein the second processing core corresponds to a central processing unit (CPU).

5. The method of claim 1, wherein a particular distance value and a particular angle value corresponding to a particular candidate line segment are determined based on angle-distance two-dimensional (2D) histogram data generated by the first processing core, and wherein the line segment information comprises a coordinate associated with the representative line segment.

6. The method of claim 1, wherein the image is divided into the first group of pixels and the second group of pixels, and wherein a first portion of a first region corresponding to the first group of pixels overlaps a second portion of a second region corresponding to of the second group of pixels.

7. A device comprising:
   one or more processing cores configured to determine first line segment data associated with multiple candidate line segments associated with a first group of pixels of an image, wherein the first line segment data comprises an angle value for each of the multiple candidate line segments, a distance value for each of the multiple candidate line segments, or a combination thereof, the one or more processing cores further configured to identify a set of line segments of the multiple candidate line segments and to determine a representative line segment based on the set of line segments, wherein the one or more processing cores are configured to identify a second group of pixels of the image based on an orientation of the representative line segment, wherein the second group of pixels is associated with a particular detected line segment, and wherein the one or more processing cores are further configured to merge the representative line segment and the particular detected line segment; and
   a memory configured to store line segment information based on the representative line segment.

8. The device of claim 7, wherein the one or more processing cores includes a first processing core and a second processing core, wherein the first processing core is included in a graphical processing unit (GPU), and wherein the second processing core is included in a central processing unit (CPU).

9. The device of claim 8, wherein the GPU and the CPU are pipelined to process the first group of pixels.

10. The device of claim 9, wherein the GPU is configured to generate two-dimensional (2D) histogram data associated with the first group of pixels during a first stage of a pipeline and to identify candidate line segment data based on the 2D histogram data during a second stage of the pipeline, the first stage followed by the second stage.

11. The device of claim 10, wherein the CPU is configured to merge multiple candidate line segments based on the candidate line segment data to determine the representative line segment during a third stage of the pipeline.

12. The device of claim 11, wherein the second stage is followed by the third stage.

13. The device of claim 7, wherein a first processing core of the one or more processing cores is included in a graphical processing unit (GPU) configured to receive image data corresponding to the image.

14. The device of claim 13, wherein the GPU is further configured, for a particular pixel included in the first group of pixels, to determine an angle value of an angle associated with a candidate line segment that includes the particular pixel and to determine a distance from the particular pixel to a reference point.

15. The device of claim 13, wherein the GPU is configured to generate two-dimensional (2D) histogram data, wherein the 2D histogram data is associated with an angle-distance 2D histogram, and wherein the GPU is configured to determine the first line segment data based on the 2D histogram data.

16. The device of claim 14, wherein the angle value is determined relative to a reference line that passes through the particular pixel, wherein a first reference point is used as the reference point when the angle value is included in a first group of angles, and wherein a second reference point is used as the reference point when the angle value is included in a second group of angles.

17. The device of claim 7, wherein a second processing core of the one or more processing cores is included in a central processing unit (CPU) configured to identify the set of line segments, to determine the representative line segment, and to store the line segment information in the memory.

18. The device of claim 7, wherein the second group of pixels is identified based on a particular angle associated with the representative line segment, and wherein the representative line segment and the particular detected line segment are merged by performing a linear regression on first coordinate data associated with the representative line segment and second coordinate data associated with the particular detected line segment.

19. A computer-readable storage device storing instructions that are executable by a processor to cause the processor to perform operations comprising:

receiving line segment data associated with multiple candidate line segments associated with a first group of pixels of an image, wherein the line segment data comprises an angle value for each of the multiple candidate line segments, a distance value for each of the multiple candidate line segments, or a combination thereof;

identifying a set of line segments of the multiple candidate line segments by comparing angle values associated with the multiple candidate line segments, by comparing distance values associated with the multiple candidate line segments, or a combination thereof;

determining a representative line segment based on the set of line segments of the multiple candidate line segments;

determining line segment information based on the representative line segment, wherein the line segment information comprises at least one end point coordinate associated with the representative line segment; and merging the representative line segment with a particular detected line segment associated with a second group of pixels of the image to generate a merged line segment.

20. The computer-readable storage device of claim 19, wherein the representative line segment is determined by performing a linear regression on coordinate data associated with the set of line segments.

* * * * *